United States Patent
Takagi et al.

(10) Patent No.: US 7,694,182 B2
(45) Date of Patent: Apr. 6, 2010

(54) DEBUGGING SYSTEM AND METHOD

(75) Inventors: Shigeya Takagi, Osaka (JP); Yasuhiko Hamada, Kyoto (JP); Hidetaka Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 401 days.

(21) Appl. No.: 11/520,806

(22) Filed: Sep. 14, 2006

(65) Prior Publication Data

US 2007/0061627 A1    Mar. 15, 2007

(30) Foreign Application Priority Data

Sep. 14, 2005  (JP) ............................. 2005-267335

(51) Int. Cl.
*G06F 11/00* (2006.01)
(52) U.S. Cl. ............................. 714/38; 714/35; 717/124
(58) Field of Classification Search ............ 714/38, 714/35; 717/124
See application file for complete search history.

(56) References Cited

U.S. PATENT DOCUMENTS 5,632,032 A *   5/1997  Ault et al. ................... 718/100
6,378,124 B1 *  4/2002  Bates et al. ................. 717/129
6,681,384 B1 *  1/2004  Bates et al. ................. 717/129
2002/0046364 A1 * 4/2002  Yoshimura .................. 714/38
2005/0034024 A1   2/2005  Alverson et al.
2006/0053413 A1   3/2006  Kimura et al.

FOREIGN PATENT DOCUMENTS

JP    2000-172532 A    6/2000

* cited by examiner

*Primary Examiner*—Yolanda L Wilson
(74) *Attorney, Agent, or Firm*—McDermott Will & Emery LLP

(57) ABSTRACT

In a multitask execution environment, a debugging device performs debugging setting for rewriting part of original recording content in a memory area shared by at least two tasks, and debugging cancellation for restoring rewritten recording content back to original recording content. The debugging device stores a memory area used by each task, and address information specifying each debugging target task and a respective address. When task switching occurs, if a next task is not a debugging target, recording content at a physical address specified by address information other than that of the next task and within the physical address space range used by the next task is put into a post-debugging cancellation state. If the next task is a debugging target task, in addition to the above processing, recording content at the physical address specified by the address information of the next task is put into a post-debugging setting state.

4 Claims, 26 Drawing Sheets

FIG. 3

| TASK IDENTIFIER | LOGICAL ADDRESS | SAVED ORIGINAL INSTRUCTION | BREAK TYPE |
|---|---|---|---|
| TASK 1 | 2K+2 ... ... | INSTRUCTION CODE A ... ... | SOFTWARE ... ... |
| TASK 2 | K-1 | | HARDWARE |
| TASK 3 | K+10 ... | INSTRUCTION CODE C ... | SOFTWARE ... |

FIG. 4

| TASK IDENTIFIER | LOGICAL ADDRESS RANGE | LOGICAL PAGE | PHYSICAL PAGE | BASE ADDRESS |
|---|---|---|---|---|
| TASK 1 | 0-K<br>(K+1)-2K<br>(2K+1)-3K | L1<br>L2<br>L3 | PH1<br>PH4<br>PH7 | ADDRESS 1<br>ADDRESS 4<br>ADDRESS 7 |
| TASK 2 | 0-K<br>(K+1)-2K<br>(2K+1)-3K | L1<br>L2<br>L3 | PH2<br>PH3<br>PH7 | ADDRESS 2<br>ADDRESS 3<br>ADDRESS 7 |
| TASK 3 | 0-K<br>(K+1)-2K<br>(2K+1)-3K | L1<br>L2<br>L3 | PH7<br>PH6<br>PH5 | ADDRESS 7<br>ADDRESS 6<br>ADDRESS 5 |

FIG. 5

| TASK IDENTIFIER | TASK PRIORITY | STACK POINTER | STATUS INFORMATION |
|---|---|---|---|
| TASK 1 | 1 | SP1 | RUNNING |
| TASK 2 | 2 | SP2 | WAITING |
| TASK 3 | 3 | SP3 | WAITING |

DEBUGGING SYSTEM AND METHOD

This application is based on application No. 2005-267335 filed in Japan, the content of which is hereby incorporated by reference.

BACKGROUND OF THE INVENTION (1) Field of the Invention

The present invention relates to a debugging system and method for a multitask environment, and in particular to a technique for, in an environment where a plurality of tasks access a same memory, controlling such that operations of tasks that access the memory are not affected when recording content of the memory is rewritten as necessary.

(2) Description of the Related Art

With advances in the functionality and performance of information appliances, automobile control devices, and the like in recent years, software embedded in such systems is becoming larger in scale and more complicated. This has resulted in increased use of operating systems (OSs) in the field of embedded software, and the majority of such OSs are multitask OSs.

Using a multitask OS enables different processing to be performed simultaneously in parallel. To achieve this, the processing time of a microcomputer is divided and the divided processing time is allocated sequentially a plurality of application programs, thus giving the impression that different processing is being performed simultaneously.

Application programs that operate on a multitask OS are processed in executable units that are called tasks, or may be called processes depending on the OS. A plurality of executable units that belong to a same process and share microcomputer resources are called a thread. In the present invention, the executable units that operate in a multitask environment are called tasks, unless a particular distinction is being made between an executable unit being a process or a thread.

Although a plurality of tasks that operate in a multitask environment generally have independent memory resources when run by a microcomputer, there are certain conditions under which the tasks share memory resources.

In the multitask OS called Linux, if one application program is run as a plurality of processes, the same memory resources are shared when one process is run as a plurality of threads.

When the microcomputer uses a memory management unit (MMU), Linux uses a virtual storage function, and tasks operate in a logical address space. When one application program is run as a plurality of processes, each process operates in a different logical address space, but physical address space is shared. Furthermore, when one process is run as a plurality of threads, the threads run in the same logical address space and share physical address space.

However, when a plurality of tasks in a multitask environment share memory resources in this way, operations of tasks are affected when processing such as break setting and rewriting of recording content of the memory is performed with respect to another task that is the target of debugging by a debugger.

For instance, a failure may occur in the operations of a running task that is not a target of debugging, due to a break stop occurring based on a break setting set for another task and an instruction rewritten for debugging being executed.

One technique for preventing such failures is disclosed by Japanese Patent Application Publication No. 2000-172532. With this technique, a break stop based on a break setting for a task that is a target of debugging is made to occur only for that task. For tasks that are not a target of debugging, processing is performed to make the break setting in the memory shared with the debugging target task invalid, and execution of the tasks that are not a target of debugging is resumed after this processing.

This technique suppresses unnecessary breaks in running tasks that are not a target of debugging, thus enabling the tasks to run normally, and improving debugging efficiency in a multitask environment.

However, with the described technique, when a break occurs in a task that is not a target of debugging, it is necessary to re-run the task. This is problematic in that it is a hindrance to real-time operation, in other words operation in a set time requirement, of tasks that are not a target of debugging.

SUMMARY OF THE INVENTION

Conceived to solve the described problem, the present invention has an object of providing a debugging system and method in which, in a multitask environment, a break setting for a task that is a target of debugging does not affect operations of tasks that are not a target of debugging.

The present invention is a debugging system that, in an execution environment in which a plurality of tasks are run successively by being switched between according to a divided time schedule, executes debugging by performing debugging setting and debugging cancellation, the debugging setting being processing for rewriting part of original recording content in a memory area shared by at least two of the tasks, and the debugging cancellation being processing for restoring the original recording content, the debugging system including: an address space storage unit operable to store, in association with each of the plurality of tasks, a physical address space range that the associated task uses in the memory area; a setting information storage unit operable to store setting information that shows a plurality of target tasks in association with address information, each target task being a task among the plurality of tasks that is a target of debugging, and the address information specifying a physical address at which the debugging setting for the associated target task is set; and a setting control unit operable to, when a task switch occurs, if a next task to be run is a target task, (a) put recording content at the physical address specified by the address information associated with the next task into a post-debugging setting state, and (b) put recording content at a physical address that is (i) specified by the address information associated with a target task other than the next task and (ii) within the physical address space range used by the next task, into a post-debugging cancellation state, and if the next task is not a target task, put recording content at a physical address that is (i) specified by the address information associated with a target task other than the next task and (ii) within the physical address space range used by the next task, into a post-debugging cancellation state.

Furthermore, the present invention is a debugging method that, in an execution environment in which a plurality of tasks are run successively by being switched between according to a divided time schedule, executes debugging by performing debugging setting and debugging cancellation, the debugging setting being processing for rewriting part of original recording content in a memory area shared by at least two of the tasks, and the debugging cancellation being processing for restoring the original recording content, the debugging method including: an address space storage unit operable to store, in association with each of the plurality of tasks, a physical address space range that the associated task uses in the memory area; and a setting information storage unit operable to store setting information that shows a plurality of target tasks in association with address information, each target task being a task among the plurality of tasks that is a target of debugging, and the address information specifying a physical address at which the debugging setting for the associated target task is set, and the debugging method including: a setting control step of, when a task switch occurs, if a next task to be run is a target task, (a) putting recording content at the physical address specified by the address information associated with the next task into a post-debugging setting state, and (b) putting recording content at a physical address that is (i) specified by the address information associated with a target task other than the next task and (ii) within the physical address space range used by the next task, into a post-debugging cancellation state, and if the next task is not a target task, putting recording content at a physical address that is (i) specified by the address information associated with a target task other than the next task and (ii) within the physical address space range used by the next task, into a post-debugging cancellation state.

With the stated structure, recording content at a physical address that is in a state of a debugging setting having been made and is in the physical address space range used by the next task when a task switch occurs can be put into a debugging-cancellation state. Therefore, the present invention is able to control such that debugging settings for tasks other than the next task do not affect operations of the next task.

Here, the setting control unit may further include: a first setting unit operable to, when any of the plurality of tasks is to be run and if the task to be run is a target task, perform debugging setting only at the physical address specified by the address information associated with the task to be run; a second setting unit operable to, each time a task switch period is subsequently arrived at and if a task to be run next is a target task, perform debugging setting only at the physical address specified by the address information associated with the task to be run next; and a cancellation unit operable to, if a pre-switch task is a target task, perform debugging cancellation with respect to the physical address of the debugging setting of the pre-switch task, the pre-switch task being a task running before the task switch.

Furthermore, the setting control step may include: a first setting step of, when any of the plurality of tasks is to be run and if the task to be run is a target task, performing debugging setting only at the physical address specified by the address information associated with the task to be run; a second setting step of, each time a task switch period is subsequently arrived at and if a task to be run next is a target task, performing debugging setting only at the physical address specified by the address information associated with the task to be run next; and a cancellation step of, if a pre-switch task is a target task, performing debugging cancellation with respect to the physical address of the debugging setting of the pre-switch task, the pre-switch task being a task running before the task switch.

With the stated structure, debugging setting and cancellation is performed only in the physical address of a task that is a target of debugging setting. Therefore, processing for debugging setting and cancellation when a task switch occurs is minimal, and the processing load required for debugging setting and cancellation can be kept to a minimum.

Here, the setting control unit may further include: a setting judgment unit operable to, each time a task switch period is reached, judge whether or not the pre-switch task and a post-switch task are both target tasks, the post-switch task being a task to be run after the pre-switch task; and an address judgment unit operable to, when the setting judgment unit judges that the pre-switch task and the post-switch task are both target tasks, judge whether or not the physical address specified by the address information of the pre-switch task and the physical address specified by the address information of the post-switch task match each other, and the second setting unit performs the debugging setting and the cancellation unit performs the debugging cancellation only if the physical addresses of the pre-switch task and the post-switch task are judged not to match each other.

Furthermore, the setting control step may further include: a setting judgment step of, each time a task switch period is reached, judging whether or not the pre-switch task and a post-switch task are both target tasks, the post-switch task being a task to be run after the pre-switch task; and an address judgment step of, when the setting judgment step judges that the pre-switch task and the post-switch task are both target tasks, judging whether or not the physical address specified by the address information of the pre-switch task and the physical address specified by the address information of the post-switch task match each other, and the second setting step performs the debugging setting and the cancellation step performs the debugging cancellation only if the physical addresses of the pre-switch task and the post-switch task are judged not to match each other.

With the stated structure, when the debugging settings of the next task and the task that was being run before the switch are made in the same physical address, processing for debugging setting and cancellation can be omitted when the task switch occurs. Therefore, the processing load when a tasks witch occurs can be lightened.

Here, the setting control unit may further include: a sharing judgment unit operable to, each time a task switch period is reached, judge whether or not the pre-switch task and a post-switch task share a physical address space range, the post-switch task being a task to be run after the task switch, and the cancellation unit performs debugging cancellation only if the pre-switch task and the post-switch task share a physical address space range.

Here, the setting control step may further include: a sharing judgment step of, each time a tasks witch period is reached, judging whether or not the pre-switch task and a post-switch task share a physical address space range, the post-switch task being a task to be run after the task switch, and the cancellation step performs debugging cancellation only if the pre-switch task and the post-switch task share a physical address space range.

With the stated structure, when the task being run before a switch and the next task share do not share a physical address space range, debugging cancellation processing when the switch occurs can be omitted. Therefore, the processing load required for debugging cancellation processing can be lightened.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 3 showing a specific example of a break setting table;

FIG. 4 is a visual representation of a page table;

FIG. 5 shows a specific example of task management information;

DESCRIPTION OF THE PREFERRED EMBODIMENTS

First Embodiment

Structure

Structure of Debugging System

Figure 1:
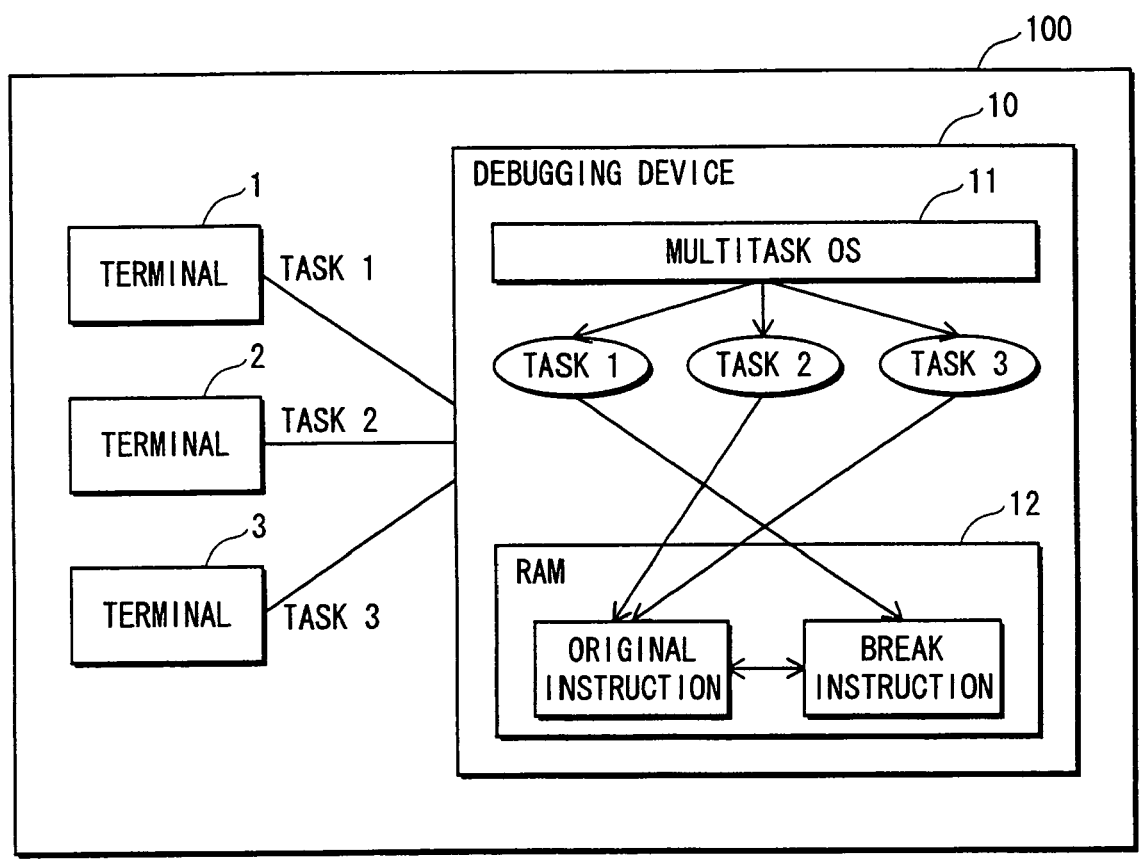
FIG. 1 is a function block diagram showing the structure of a debugging system 100 of a first embodiment of the present invention.

FIG. 1 is a function block diagram showing the structure of a debugging system 100 relating to the present embodiment. The debugging system 100 is composed of terminals 1 to 3 and a debugging device 10.

The terminals 1 to 3 are connected to the debugging device 10 with respective communication lines. Each of the terminals 1 to 3 has a function of outputting various commands to the debugging device 10 via the respective communication line, receiving a processing result from the debugging device 10 based on the particular output command, and displaying the result on a display unit (not illustrated).

The debugging device 10 has a function of loading an application program to a physical address space in a RAM 12 in accordance with an application program execution command from any of the terminals 1 to 3, executing a task by executing the application program under the control of a multitask OS 11, and transmitting the execution result to the one of the terminals 1 to 3 that requested execution of the application program.

If a command received from the one of the terminals 1 to 3 is an execution instruction for an application program that is a debugging target, the debugging device 10 creates a break instruction by rewriting an original instruction that is recorded in an address, in a physical address space of the RAM 12, that is associated with an address in a logical address space registered in a break setting table (described later). The debugging device 10 then runs the application program that is a target of debugging under the control of the multitask OS 11, and when the break instruction is detected, stops the application, and transmits a processing result to the one of the terminals 1 to 3.

FIG. 1 shows a specific example of a task 1 running as a result of input of an application program execution command from the terminal 1, a task 2 running as a result of input of an application program execution command from the terminal 2, and a task 3 running as a result of input of an application program execution command from the terminal 3.

FIG. 1 also shows that task 1, task 2 and task 3 share a memory area in the RAM 12.

Structure of Debugging Device 10

Figure 2:
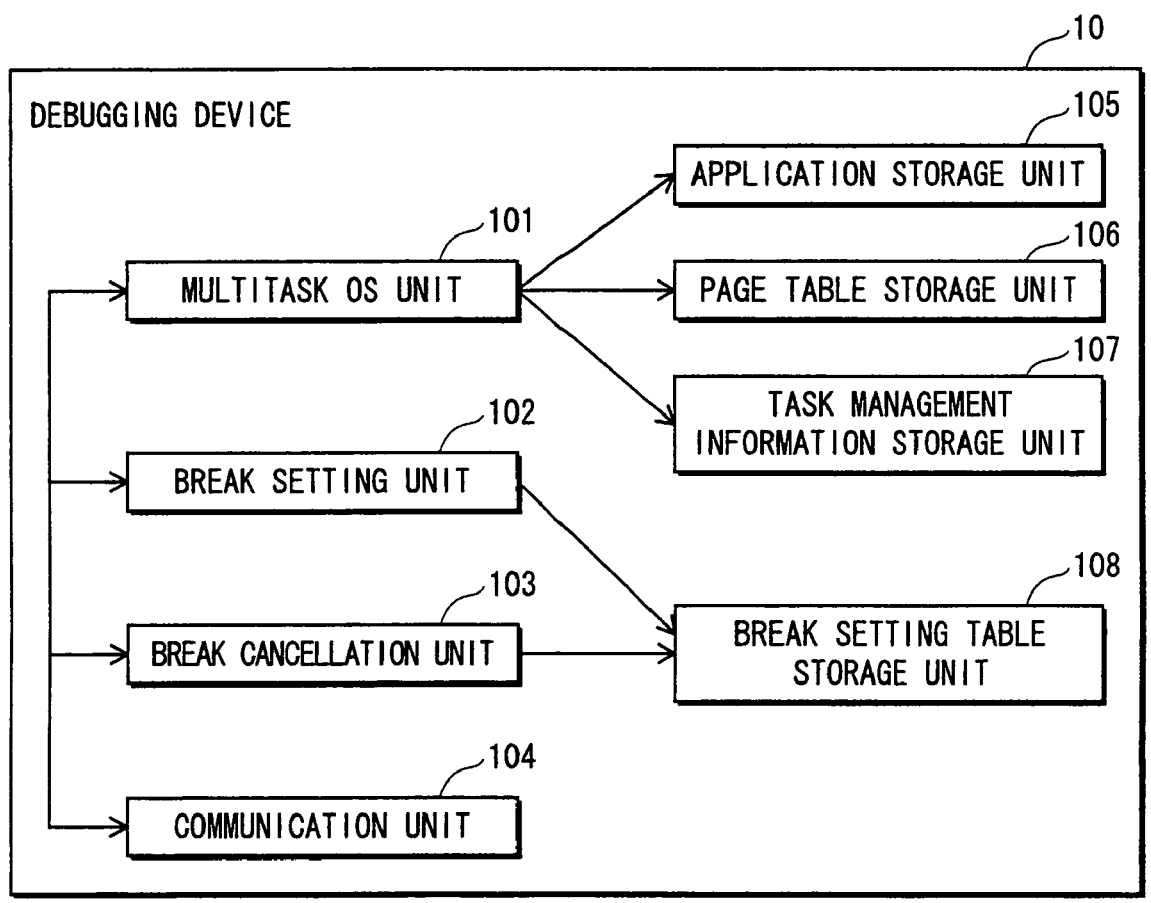
FIG. 2 is a function block diagram showing the structure of a debugging device 10.

FIG. 2 is a function block diagram showing the structure of the debugging device 10. The debugging device 10 is composed of a multitask OS unit 101, a break setting unit 102, a break cancellation unit 103, a communication unit 104, an application storage unit 105, a page table storage unit 106, a task management information storage unit 107, and a break setting table storage unit 108.

Multitask OS Unit 101

The multitask OS unit 101 is composed of a CPU, an MMU (memory management unit), and a ROM/RAM 12 that includes the multitask OS 11. The multitask OS unit 101 has a function of executing application programs and performing time division control of execution of tasks caused by the application programs.

The MMU has a function of converting logical addresses to physical addresses, and managing the ROM/RAM 12.

Application Storage Unit 105

The application storage unit 105 has a function of storing application programs that are a target of debugging and application programs that are not a target of debugging.

Page Table Storage Unit 106

The page table storage unit 106 has a function storing a page table.

The page table is a table that is created and managed by the multitask OS unit 101, and is for converting a logical address referenced by an running task into a physical address in the RAM 12. More specifically, the multitask OS unit 101 segments the logical address space range referenced by tasks into a plurality of blocks (hereinafter, each block is called a "logical page") based on ranges of logical addresses, and allocates physical address ranges (hereinafter, called a "physical pages") of a size corresponding to the block units. The page table shows, for each task, the correlation between each logical page and the head physical address (hereinafter, called the "base address") in the physical page allocated to the logical page.

One example of the size of each logical page is 4 Kbytes. In such a case, the base address of the corresponding physical page is the lowest 12 bits of the logical address are added to the base address of the corresponding physical page as an offset value, based on which conversion from the logical address to the physical address is performed.

FIG. 4 is a visual representation of the page table. As shown in FIG. 4, the logical page that each logical address belongs to is specified based on the logical address range, and each specified logical page is allocated a physical page of the same size in the RAM 12.

Figure 6:
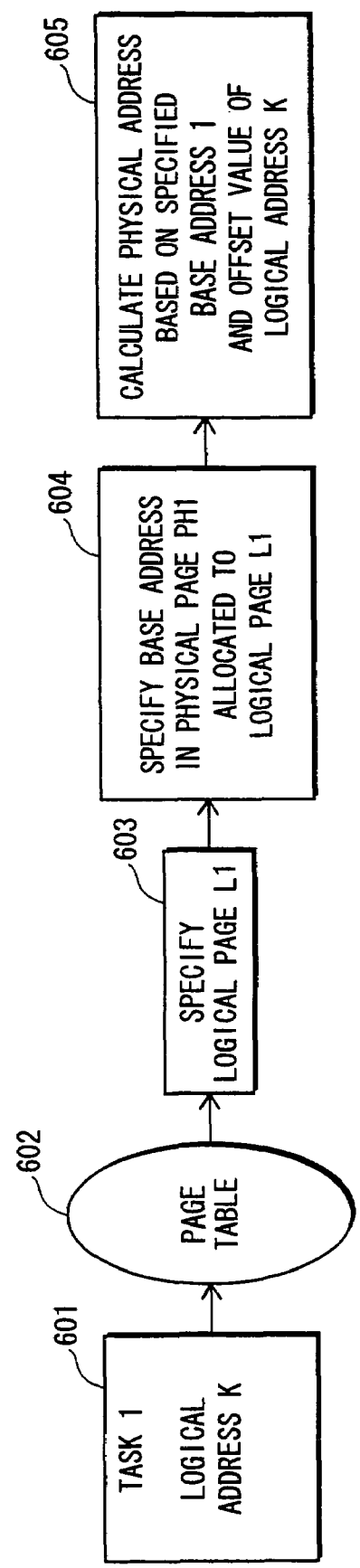
FIG. 6 is a visual representation of an address conversion process performed by a multitask OS unit 101.

FIG. 6 is a visual representation of the address conversion process performed by the multitask OS unit 101. FIG. 6 shows a specific example of a process for converting a logical address K referenced by task 1 to a physical address.

As shown in FIG. 6, in the process performed with respect to the logical address K reference by task 1 (601 in FIG. 6), the page table (602 in FIG. 6, for convenience assumed to be identical in content to the page table in FIG. 4) is used to specify the logical page L1 to which the logical address K belongs (603 in FIG. 6), and the page table is further used to specify the base address 1 in the physical page PH1 that is associated with the logical page L1 (604 in FIG. 6). Finally, the physical address corresponding to the logical address K is calculated based on the specified base address 1 and the offset value of the logical address K (605 in FIG. 6).

Task Management Information Storage Unit 107

The task management information storage unit 107 stores task management information.

The task management information is information expressing sets of the following correlated items: an identifier of a task that is a target of time division control; status information showing the run status of the task; a value of a stack pointer showing the save-destination of the context of the task; and a task priority showing the run priority of the task at the current point in time. The task management information is created and managed by the multitask OS unit 101.

FIG. 5 shows a specific example of the task management information.

Break Setting Unit 102

The break setting unit 102 performs break setting registration processing and break setting processing.

Break setting refers to designating an instruction for stopping a running application program part way through and the point to stop the application program, according to a logical address.

1. Break Setting Registration Processing

When a registration command for registering a break setting is input by one of the terminals 1 to 3 via the communication unit 104, the break setting unit 102 analyses the registration command, specifies the task identifier, the logical address set as a break, and the break type designated by the registration command, and registers the specified task identifier, logical address, and break type in the break setting table.

A plurality of break settings may be registered in the break setting table with respect to one task.

The break setting table is a table expressing sets of the following correlated items: a task identifier, the logical address of a break setting set with respect to the task, and the break type.

The break type is an identifier showing whether the type of the break setting is a software break or a hardware break.

A software break is a break setting whereby a running application program is stopped by rewriting an original instruction in the application program at a specified logical address into an instruction for stopping the application program (hereinafter, an instruction for stopping the application program is called a "break instruction").

A hardware break is a break setting whereby a logical address that shows a stop position in the application program (hereinafter, this logical address is called a "break address") is set in the CPU register, and when the CPU references the set logical address or executes the instruction at this logical address, the running application program stops part way through.

When the break setting is a software break, the original instruction rewritten with the break instruction is saved to the break setting table, and stored in the break setting table in association with the corresponding task identifier and logical address.

2. Break Setting Processing

When the multitask OS unit 101 newly runs a task or switches tasks, the break setting unit 102 obtains, from the multitask OS unit 101, the task identifier of the next task to be run, specifies the task identifier of the next task to be run, and judges whether or not the specified task identifier is registered in the break setting table (described later). If the task identifier is registered, the multitask OS unit 101 further judges, based on the break type associated with the task identifier in the break setting table, whether or not the break setting is a hardware break or a software break. If the break setting is a hardware break, the multitask OS unit 101 sets the registered logical address in the register. If the break setting is a software break, the multitask OS unit 101 obtains the physical address in the RAM 12 corresponding to the logical address registered in the break setting table, saves the original instruction stored at the physical address to the break setting table, and writes a break instruction at the physical address.

Break Cancellation Unit 103

The break cancellation unit 103 performs break setting deletion processing and break setting cancellation processing.

1. Break Setting Deletion Processing

When a deletion command for deleting a break setting is input from one of the terminals 1 to 3 via the communication unit 104, the break cancellation unit 103 analyses the deletion command, specifies the task identifier, logical address and break type specified by the deletion command, and deletes the break setting having the specified task identifier, logical address and break type from the break setting table.

2. Break Setting Cancellation Processing

When the multitask OS unit 101 switches tasks, the break cancellation unit 103 obtains the task identifier of the stopped task from the multitask OS unit 101, and judges whether or not the obtained task identifier is registered in the break setting table. If the obtained task identifier is registered in the break setting table, the break cancellation unit 103 further judges, based on the break type associated with the break identifier in the break setting table, whether the registered break setting is a software break or a hardware break. If the registered break setting is a hardware break, the break cancellation unit 103 cancels the setting of the break address in the register. If the registered break setting is a software break, the break cancellation unit 103 obtains, from the multitask OS unit 101, the physical address in the RAM 12 corresponding to the logical address registered in the break setting table, and writes the original instruction that was saved to the break setting table to the physical address in the RAM 12. This cancels the break setting.

Communication Unit 104

The communication unit 104 receives various commands input from the terminals 1 to 3, and outputs each command to the multitask OS unit 101, the break setting unit 102, the break cancellation unit 103 or the communication 104, as appropriate.

Break Setting Table Storage Unit 108

The break setting table storage unit 108 stores the break setting table. One specific example of the break setting table is that shown in FIG. 3.

Operations

Break Setting Registration Processing

Figure 8:
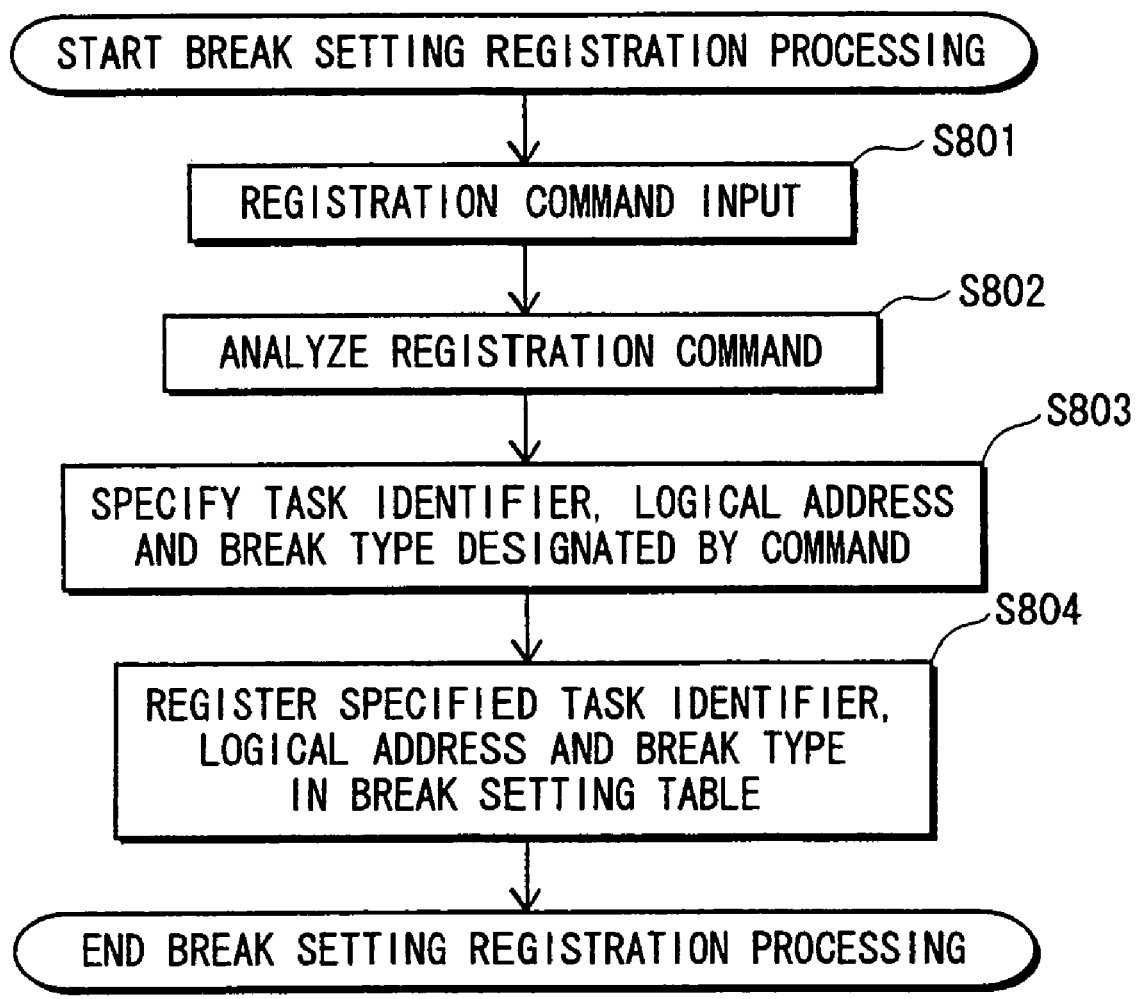
FIG. 8 is a flowchart showing operations for break setting registration processing performed by a break setting unit 102.

FIG. 8 is a flowchart showing operations for break setting registration processing performed by the break setting unit 102.

When a registration command for registering a break setting is input from one of the terminals 1 to 3 via the communication unit 104 (step S801), the break setting unit 102 analyzes the registration command (step S802), specifies the task identifier, the logical address of the break setting and the break type designated by the registration command (step S803), and registers the specified task identifier, logical address, and the break type in the break setting table (step S804).

Break Setting Deletion Processing

Figure 21:
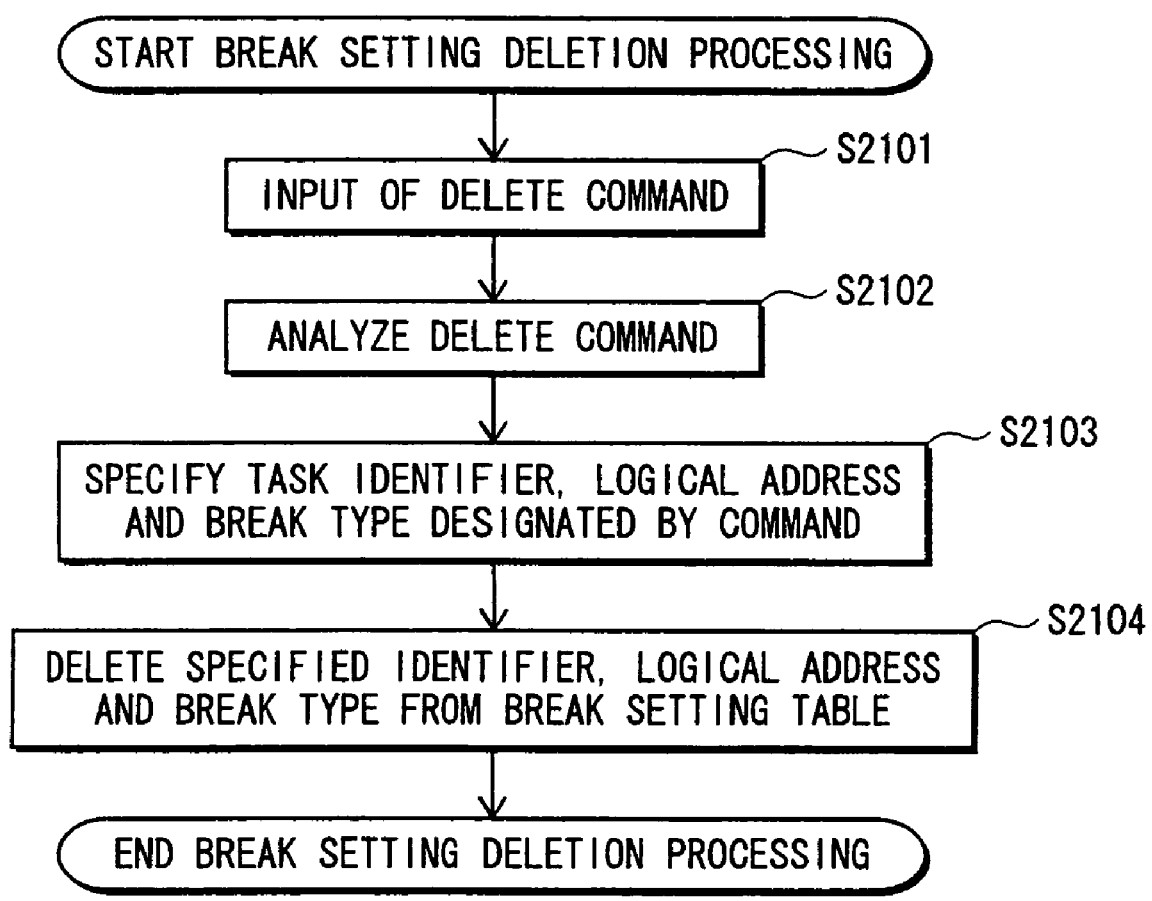
FIG. 21 is a flowchart showing operations for break setting deletion processing performed by the break cancellation unit 103.

FIG. 21 is a flowchart showing operations for break setting deletion processing performed by the break cancellation unit 103.

When a deletion command for deleting a break setting is received from one of the terminals 1 to 3 (step S2101), the break cancellation unit 103 analyses the deletion command (step S2102), specifies the task identifier, logical address and break type designated by the deletion command (step S2103), and deletes the specified task identifier, logical address and break type from the break setting table (step S2104).

Task Switch Processing A

Figure 7:
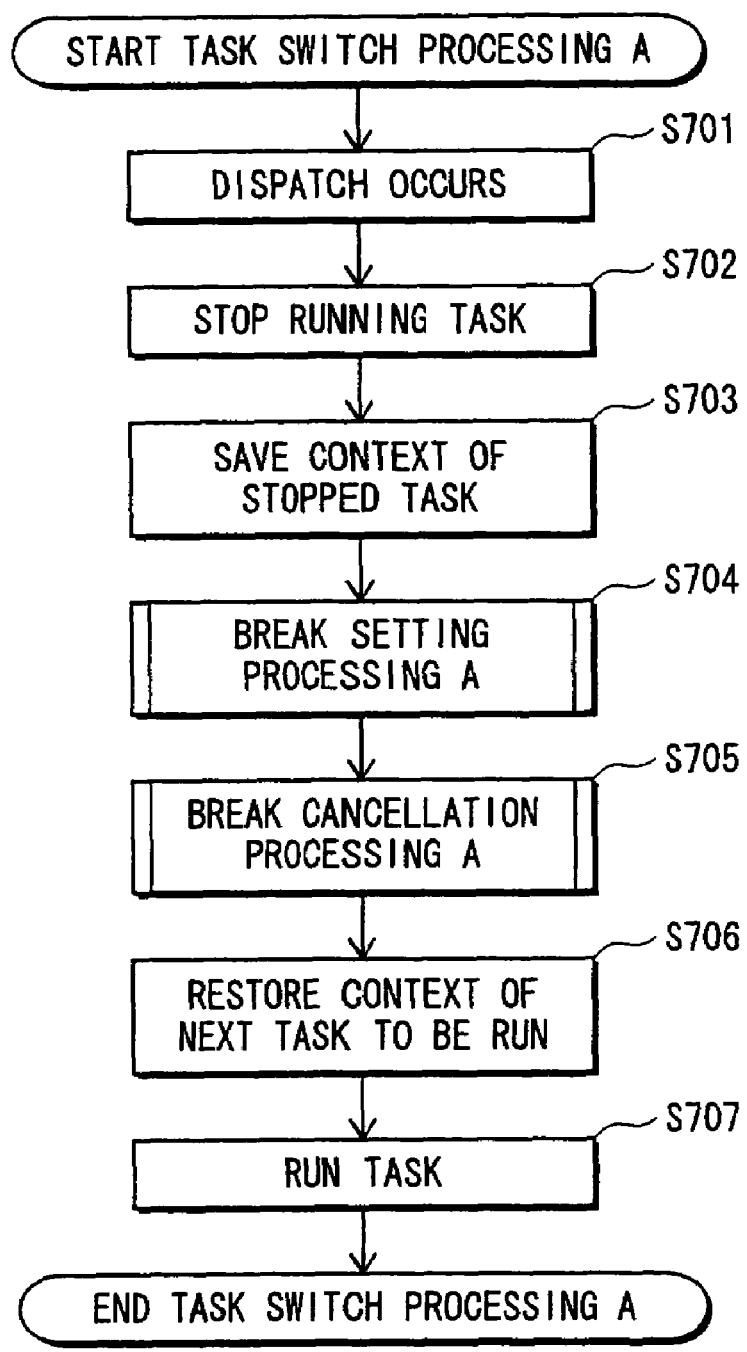
FIG. 7 is a flowchart showing operations for task switch processing A performed by the multitask OS unit 101.

FIG. 7 is a flowchart showing operations for task switch processing A performed by the multitask OS unit 101.

When a dispatch (task switch) occurs (step S701), the multitask OS unit 101 stops the running task (step S702), and stores the context (register set, program counter, status register, and so on) of the running task to a memory area (stack area) allocated to the task in the RAM 12, thereby saving the context (step S703). The multitask OS unit 101 then rewrites, with the value of the save destination stack pointer, the value of the stack pointer associated with the task identifier in the task management information stored in the task management information storage unit 107, updates the task priority and the status information of the task, and moves control to the break setting unit 102 which it causes to execute break setting processing A (described later, step S704). After further moving the control to the break cancellation unit 103 and causing it to execute break cancellation processing A that is described later (step S705), the multitask OS unit 101 refers to the task priorities in the task management information to select the task having the highest task priority as the task to be run next, reads the context of the selected task from the save destination of the context showing the stack pointer of the selected task, restores the context (step S706), and runs the task (step S707).

Break Setting Processing A

Figure 9:
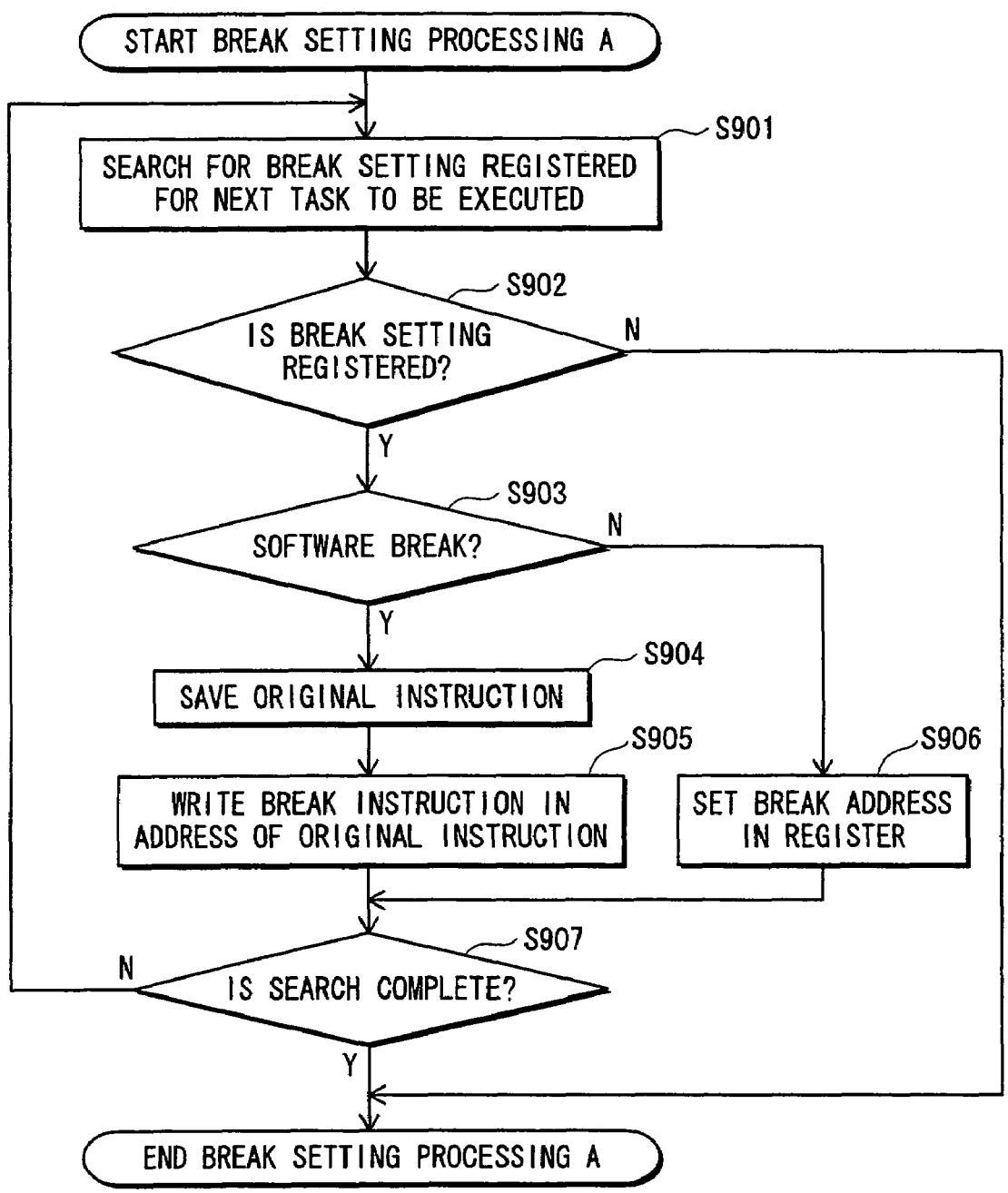
FIG. 9 is a flowchart showing break setting processing A performed by the break setting unit 102.

FIG. 9 is a flowchart showing operations of break setting processing A performed by the break setting unit 102.

The break setting unit 102 obtains, from the multitask OS unit 101, the task identifier of the next task to be run, specifies the task identifier of the next task to be run, and refers to the break setting table stored in the break setting table storage unit 108 to make a search as to whether or not a break setting is registered for the task identifier (step S901). If a break setting is registered for the task identifier (step S902:Y), the break setting unit 102 judges whether or not the break type of the break setting is a software break (step S903).

If the break type is a software break (step S903:Y), the break setting unit 102 notifies the logical address at which the break setting is set to the multitask OS unit 101, causes the multitask OS unit 101 to specify the physical address in the RAM 12 of the logical address, obtains the specified physical address from the multitask OS unit 101, and saves the original instruction stored at the physical address, by storing the original address and the task identifier and logical address of the break setting in association in the break setting table (step S904). The break setting unit 102 then performs break setting by writing a break instruction in the physical address of the original instruction (step S905), and judges whether or not the break setting table has been searched for all break settings registered with respect to the obtained task identifier (step S907). If the search is complete (step S907:Y), the break setting unit 102 ends the break setting processing A. If the search is not complete (step S907:N), the break setting unit 102 moves to the processing at step S901.

If the judgment is negative at step S903 (step S903:N), the break setting unit 102 sets the break address in a register of the CPU (step S906).

If the judgment is negative at step S902 (step S902:N), the break setting unit 102 ends the break setting processing A.

Break Cancellation Processing A

Figure 10:
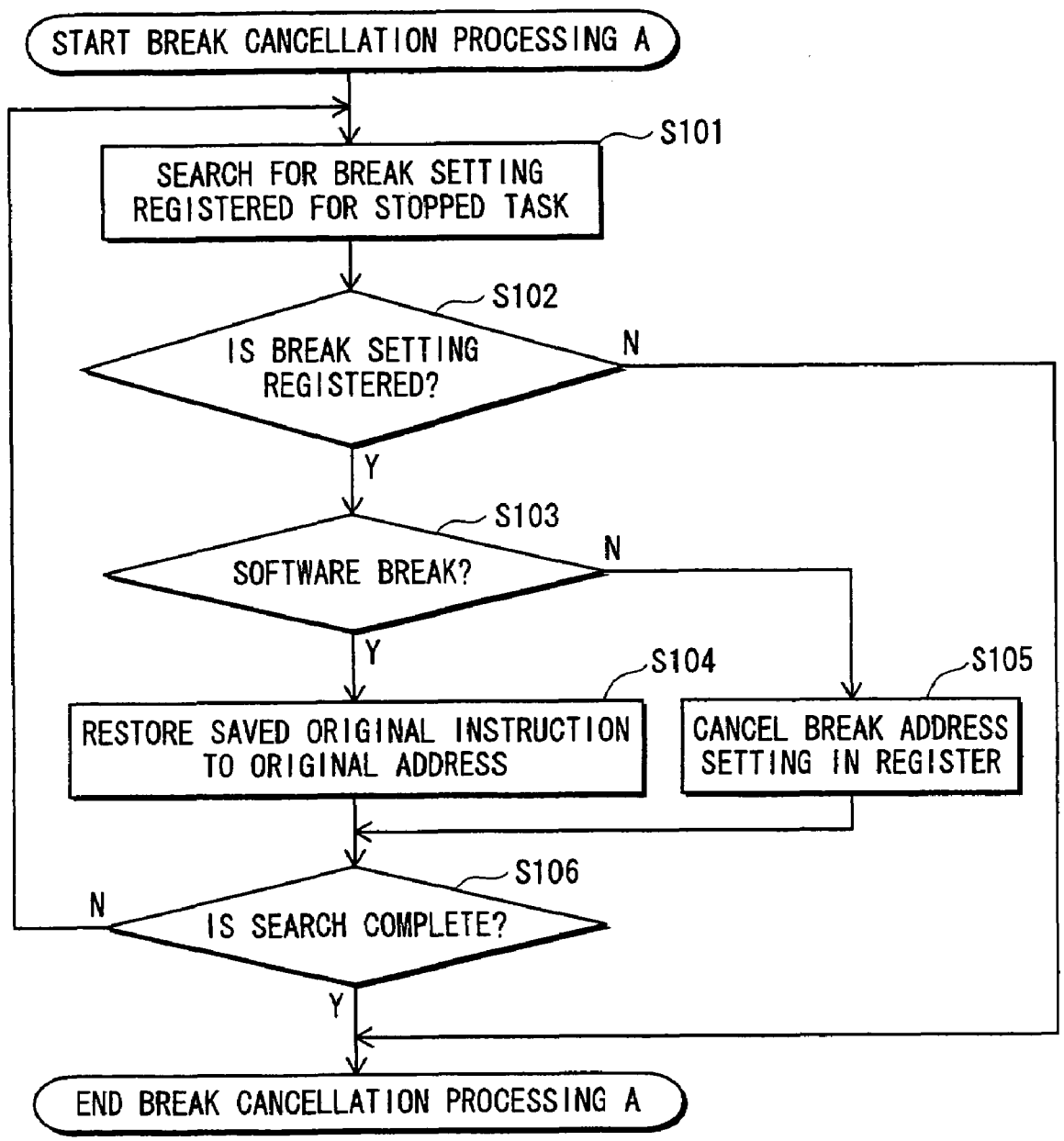
FIG. 10 is a flowchart showing operations for break cancellation processing A performed by a break cancellation unit 103.

FIG. 10 is a flowchart showing operations for break cancellation processing A performed by the break cancellation unit 103.

The break cancellation unit 103 obtains the identifier of a stopped task from the multitask OS unit 101, and refers to the break setting table stored in the break setting table storage unit 108 to make a search as to whether or not a break setting is registered for the task identifier (step S101). If a break setting is registered for the task identifier (step S102:Y), the break cancellation unit 103 judges whether or not the break type of the break setting is a software break (step S103).

If the break type is a software break (step S103:Y), the break cancellation unit 103 notifies the logical address of the break setting to the multitask OS unit 101, causes the multitask OS unit 101 to specify the physical address in the RAM 12 of the logical address, obtains the specified physical address from the multitask OS unit 101, and writes the original instruction saved in the break setting table with respect to the break setting to the obtained physical address, thereby restoring the original instruction (step S104). The break cancellation unit 103 then judges whether or not the break setting table has been searched for all break settings registered with respect to the identifier of the stopped task (step S106). If the search is complete (step S106:Y), the break cancellation unit 103 ends the break cancellation processing A. If the search is not complete (step S106:N), the break cancellation unit 103 moves to the processing at step S101.

If the judgment is negative at step S103 (step S103:N), the break cancellation unit 103 cancels the break address setting in the register of the CPU (step S105).

If the judgment is negative at step S102 (step S102:N), the break cancellation unit 103 ends the break cancellation processing A.

Second Embodiment

In the debugging system 100 of the first embodiment, break setting processing and break cancellation processing are performed each time a tasks witch occurs. However, in a debugging system 200 of the second embodiment, when a break setting has been made for the next task to be run that is the same as the break setting for the directly preceding stopped task, break setting processing and break cancellation processing when task switching occurs are omitted. This enables task switch processing to be performed quickly. Note that the debugging system 200 differs from the debugging system 100 of the first embodiment only in terms of structure described below, and other compositional elements are identical. Consequently, a function block diagram showing the structure of the debugging system 200 is omitted. This also applies to debugging systems 300, 400 and 500 described later.

Structure

The following omits a description of the compositional elements that are the same as in the debugging system 100 in the first embodiment, and focuses on those that differ.

Structure of Debugging Device 20

Figure 22:
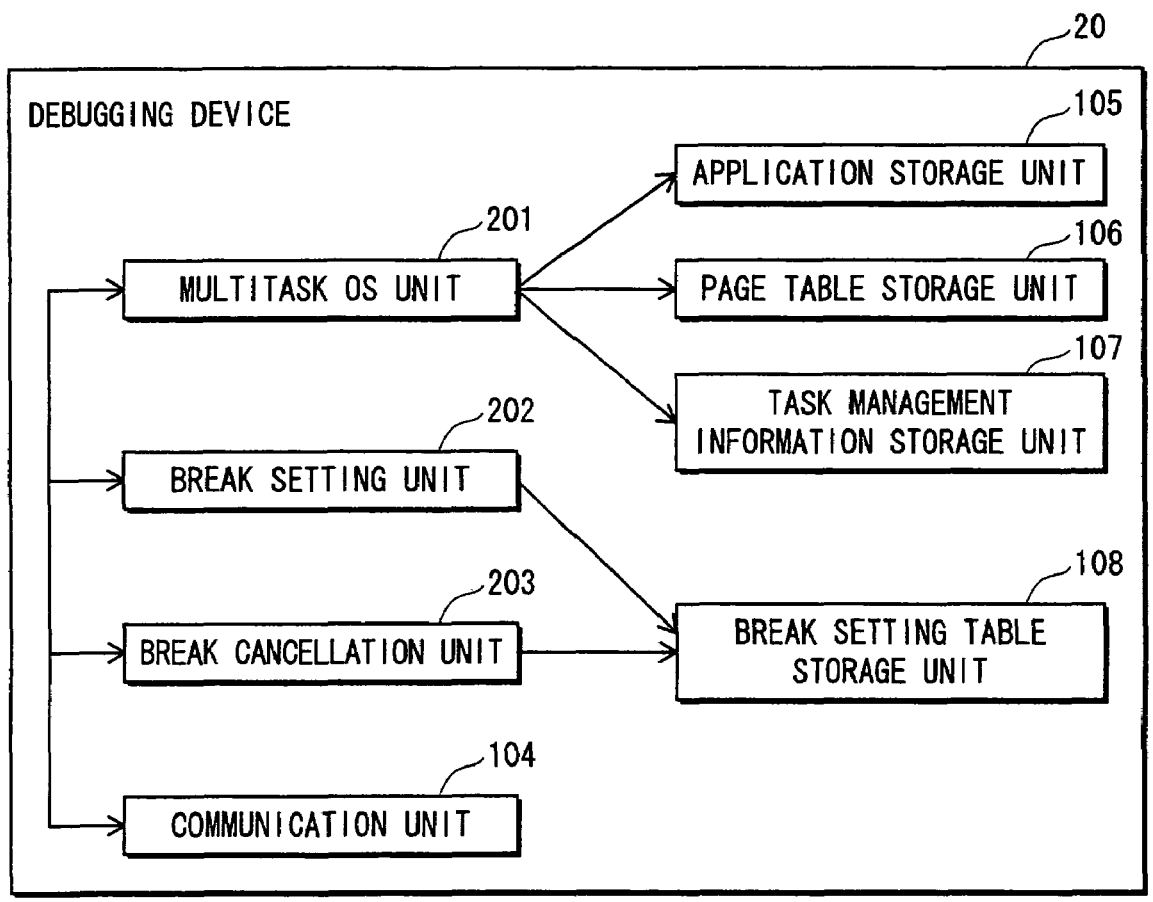
FIG. 22 is a function block diagram showing the structure of a debugging device 20 included in a debugging system 200.

FIG. 22 is a function block diagram showing the structure of a debugging device 20. The debugging device 20 is composed of a multitask OS unit 201, a break setting unit 202, a break cancellation unit 203, the communication unit 104, the application storage unit 105, the page table storage unit 106, the task management information storage unit 107, and the break setting table storage unit 108.

In FIG. 22, the compositional elements that are the same as those in the debugging device 10 of the first embodiment have the same reference numbers thereas.

The differences from the first embodiment in the functions of the multitask OS unit 201, the break setting unit 202 and the break cancellation unit 203 are described later.

Operations

The following description focuses on differences from the first embodiment, and omits operations that are the same as the first embodiment.

Task Switch Processing B

Figure 11:
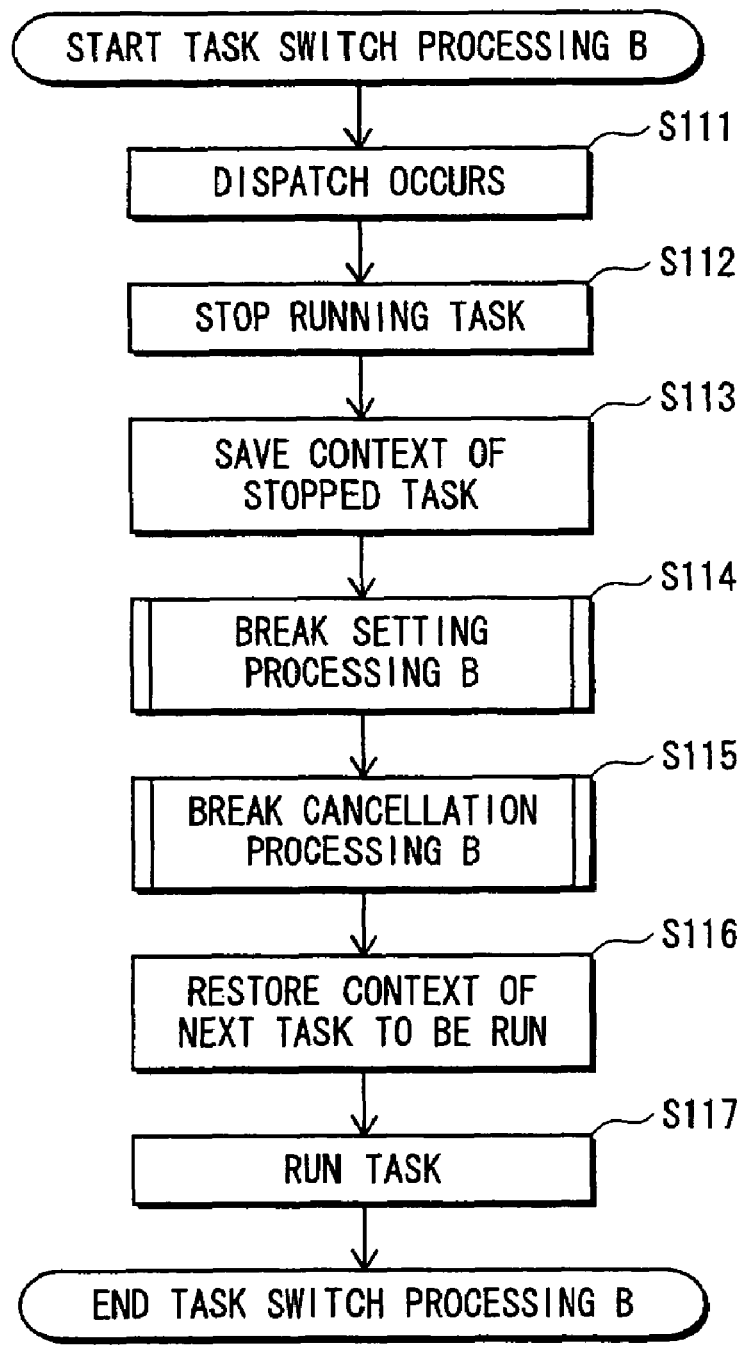
FIG. 11 is a flowchart showing operations for task switch processing B performed by a multitask OS unit 201.

FIG. 11 is a flowchart showing operations for task switch processing B performed by the multiplex OS unit 201. As shown in FIG. 11, the task switch processing B differs from the task switch processing A in the first embodiment in terms of the contents of the break setting processing and the break cancellation processing at step S114 and step S115.

Break Setting Processing B

Figure 12:
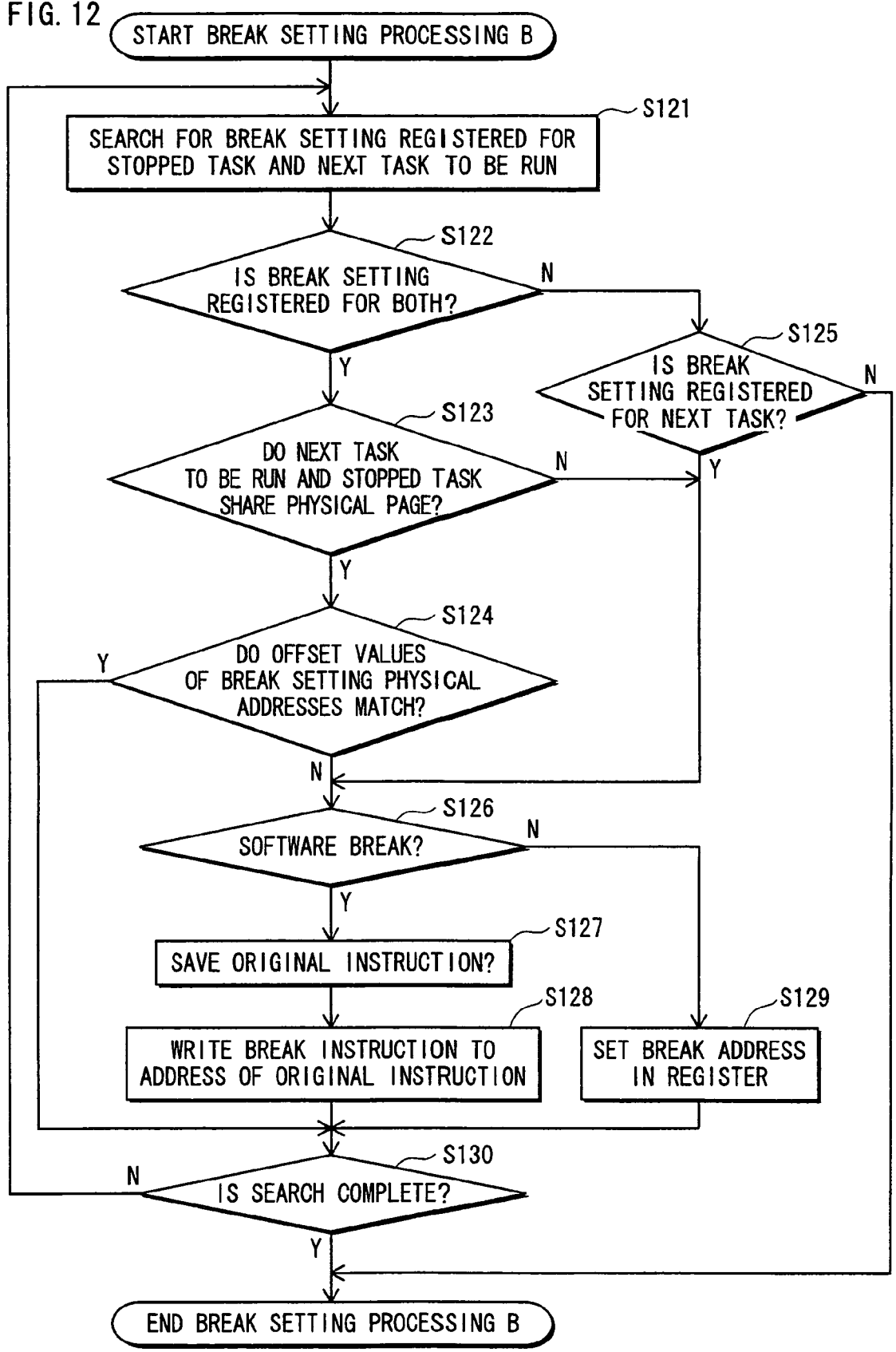
FIG. 12 is a flowchart showing operations for break setting processing B performed by a break setting unit 202.

FIG. 12 is a flowchart showing operations for break setting processing B performed by the break setting unit 202. In the break setting processing B, the processing at step S121 to step S125 differs from the break setting processing A of the first embodiment, and the processing at step S126 to step S130 is the same as the processing at step S903 to step S907 in the break setting processing A of FIG. 9.

The following describes the processing at step S121 to step S125, and omits a description of the other processing.

The break setting unit 202 obtains, from the multitask OS unit 201, the respective task identifiers of the stopped task and the task that is to be run next, specifies the two task identifiers, and refers to the break setting table stored in the break setting table storage unit 108 to make a search as to whether or not a break setting is registered for both the task identifiers (step S121). If a break setting is registered for both the task identifiers (step S122:Y), the break setting unit 202 notifies the respective logical addresses of the break settings to the multitask OS unit 201, obtains the respective physical addresses to which the logical addresses belong, from the multitask OS unit 201, and judges whether or not the two share a physical page (step S123).

Here, the multitask OS unit 201 refers to the page table stored in the page table storage unit 106 to specify the physical addresses associated with the notified logical addresses, and notifies the physical addresses to the break setting unit 202.

At step S123, if the logical addresses share a physical page (step S123:Y), the break setting unit 202 judges whether or not the respective offset values of the logical addresses match (step S124). If the offset values match (step S124:Y), the break setting unit 202 moves to the processing at step S130, and if the offset values do not match (step S124:N), the break setting unit 202 moves to the processing at step S126.

At step S123, if the logical addresses share a physical page (step S123:N), the break setting unit 202 moves to the processing at step S126.

If it is judged that a break setting is not registered for both the task identifiers at step S122 (step S122:N), and if a break setting is registered only for the next task to be run (step S125:Y), the break setting unit 202 moves to the processing at step S126.

If the judgment at step S125 is negative (step S125:N), the break setting unit 202 ends the break setting processing B.

Break Cancellation Processing B

Figure 13:
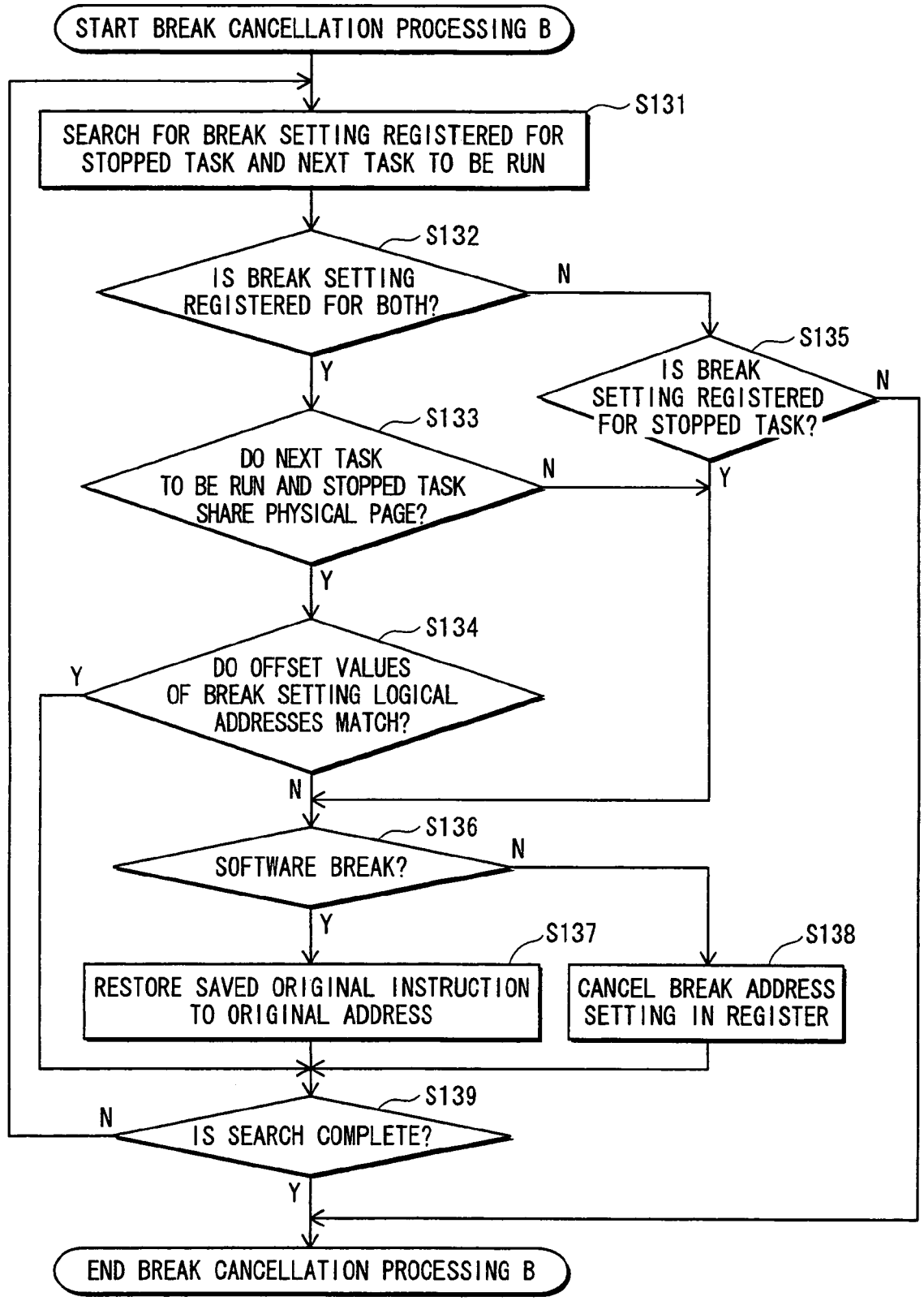
FIG. 13 is a flowchart showing operations for break cancellation processing B performed by a break cancellation unit 203.

FIG. 13 is a flowchart showing operations for break cancellation processing B performed by the break cancellation unit 203.

In break cancellation processing B, the processing at step S131 to step S135 differs from the break cancellation processing A of the first embodiment, and the processing at step S136 to step S139 is the same as the processing at step S103 to step S106 in the break cancellation processing B of FIG. 10.

The following describes the processing at step S131 to step S135, and omits a description of the other processing.

The break cancellation unit 203 obtains, from the multitask OS-unit 201, the respective task identifiers of the stopped task and the next task to be run, and refers to the break setting table stored in the break setting table storage unit 108 to make a search as to whether or not a break setting is registered for both the task identifiers (step S131). If a break setting is registered for both the task identifiers (step S132:Y), the break cancellation unit 203 notifies the respective logical addresses of the break settings to the multitask OS unit 201, obtains the respective physical pages to which the logical addresses belong, from the multitask OS unit 201, and judges whether or not the two share a physical page (step S133).

Here, the multitask OS unit 201 refers to the page table stored in the page table storage unit 106 to specify the respective physical pages associated with the notified logical addresses, and notifies the physical pages to the break cancellation unit 203.

At step S133, if the logical addresses share a physical page (step S133:Y), the break cancellation unit 203 judges whether or not the respective offset values of the logical addresses match (step S134). If the offset values match (step S134:Y), the break cancellation unit 203 moves to the processing at step S139, and if the offset values do not match (step S134:N), the break cancellation unit 203 moves to the processing at step S136.

At step S133, if the logical addresses do not share a physical page (step S133:N), the break cancellation unit 203 moves to the processing at step S136.

If it is judged that a break setting is not registered for both the task identifiers at step S132 (step S132:N), and if a break setting is registered only for the next task to be run (step S135:Y), the break cancellation unit 203 moves to the processing at step S136.

If the judgment at step S135 is negative (step S135:N), the break cancellation unit 203 ends the break cancellation processing B.

Third Embodiment

In the debugging system 100 of the first embodiment, break setting processing and break cancellation processing are performed each time a task switch occurs. However, in the debugging system 300 of the third embodiment, when a task switch occurs, all break settings registered in the break setting table are performed first, and then all of the break settings whose physical address differs from that of the task to be run next are cancelled.

Structure

The following omits a description of the compositional elements that are the same as in the debugging system 100 in the first embodiment, and focuses on those that differ.

Structure of Debugging Device 30

Figure 23:
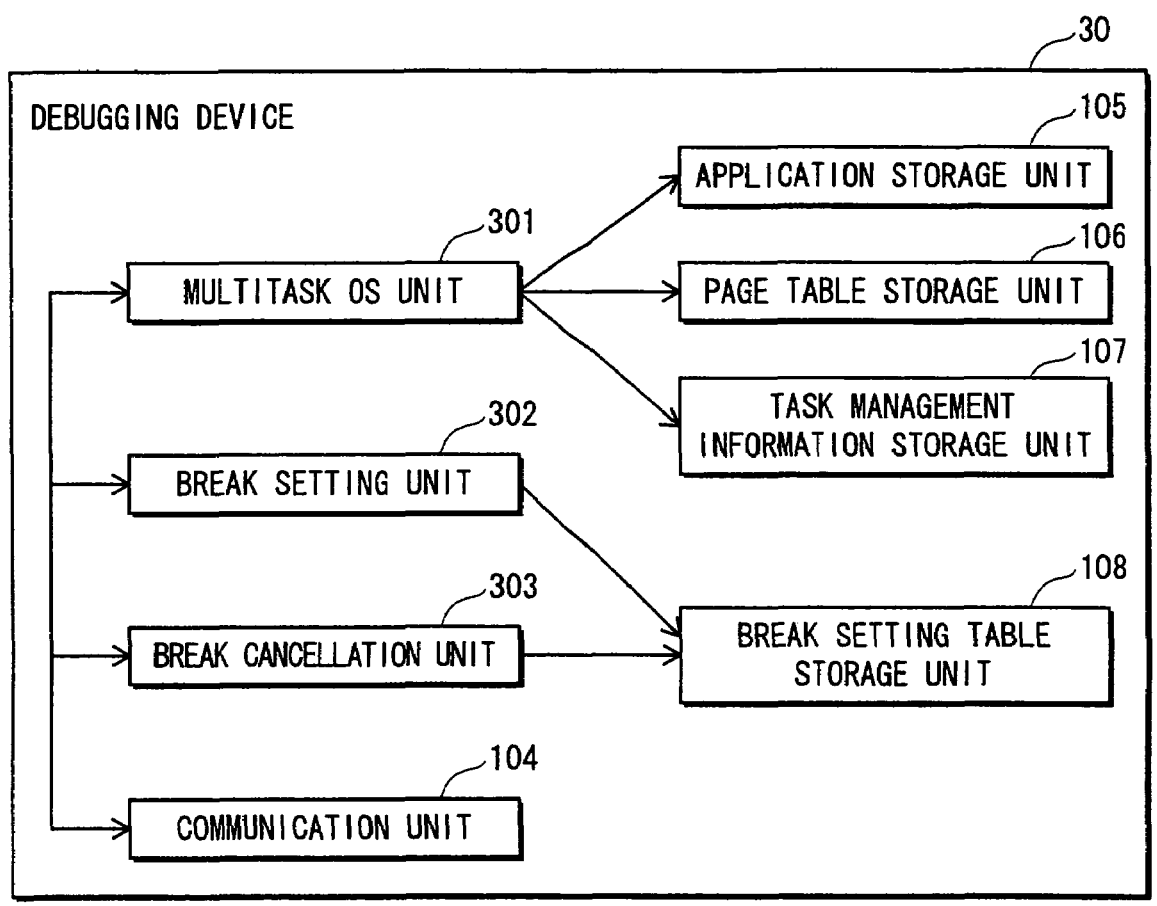
FIG. 23 is a function block diagram showing the structure of a debugging device 30 included in a debugging system 300.

FIG. 23 is a function block diagram showing the structure of a debugging device 30 included in the debugging system 300. The debugging device 30 is composed of a multitask OS unit 301, a break setting unit 302, a break cancellation unit 303, the communication unit 104, the application storage unit 105, the page table storage unit 106, the task management information storage unit 107, and the break setting table storage unit 108.

In FIG. 23, the compositional elements that are the same as those in the debugging device 10 of the first embodiment have the same reference numbers there as.

The differences from the first embodiment in the functions of the multitask OS unit 301, the break, setting unit 302 and the break cancellation unit 303 are described later.

Operations

The following description focuses on differences from the first embodiment, and omits operations that are the same as the first embodiment.

Task Switch Processing C

Figure 15:
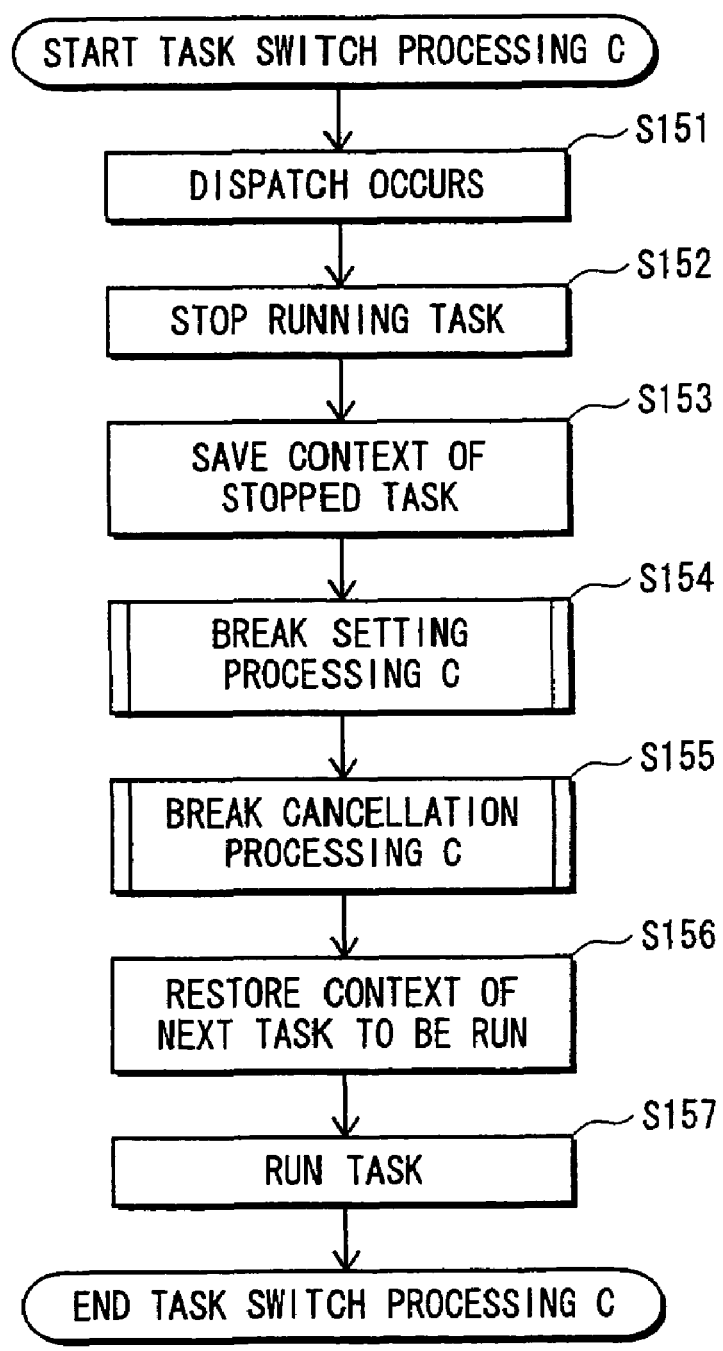
FIG. 15 is a flowchart showing operations for task switch processing C performed by a multitask OS unit 301.

FIG. 15 is a flowchart showing operations for task switch processing C performed by the multitask OS unit 301.

As shown in FIG. 15, the task switch processing C differs from the task switch processing A in the first embodiment in terms of the contents of break setting processing and break cancellation processing shown at step S704 and step S705, respectively.

Break Setting Processing C

Figure 14:
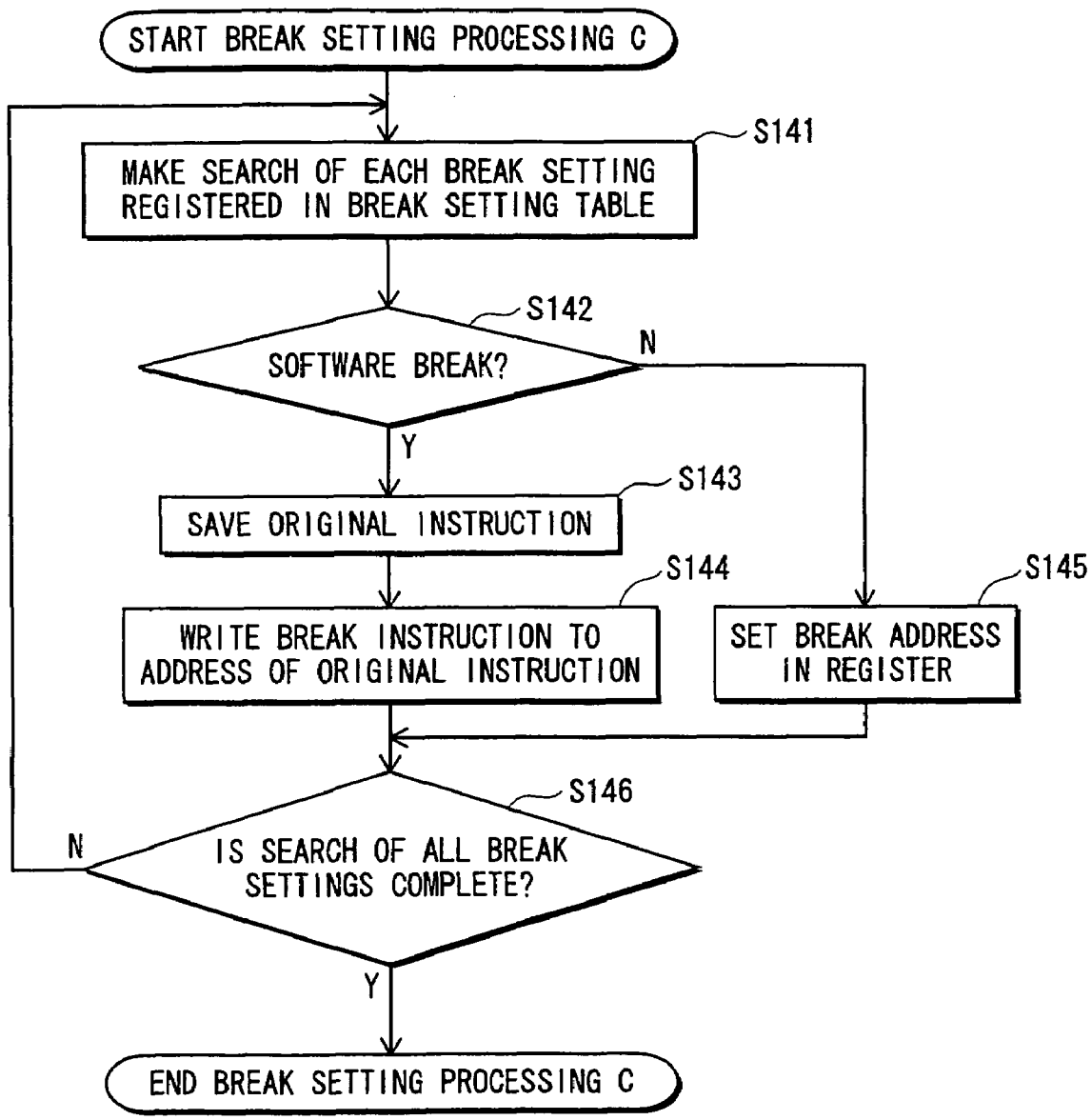
FIG. 14 is a flowchart showing operations for break setting processing C performed by a break setting unit 302.

FIG. 14 is a flowchart showing operations for break setting processing C performed by the break setting unit 302.

The break setting unit 302 makes a search of the break settings registered in the break setting table (step S141), and, for each one of the break settings found as a result of the search, judges whether or not the break setting is a software break, based on the break type of the break setting (step S142).

If the break is a software break (step S142:Y), the break setting unit 302 notifies the logical address set for the break setting to the multitask OS unit 301, causes the multitask OS unit 301 to specify the physical address in the RAM 12 of the logical address, obtains the specified physical address from the multitask OS unit 301, and saves the original instruction stored in the logical address, by storing the original address and the task identifier and logical address of the break setting in association in the break setting table (step S143). The break setting unit 302 then performs break setting by writing a break instruction to the physical address of the original instruction (step S144), and judges whether or not the break setting table has been searched for all registered break settings (step S146). If the search is complete (step S146:Y), the break setting unit 302 ends the break setting processing C. If the search is not complete (step S146:N), the break setting unit 302 moves to the processing at step S141.

If the judgment is negative at step S142 (step S142:N), the break setting unit 302 sets the break address in a register of the CPU (step S145).

Break Cancellation Processing C

Figure 16:
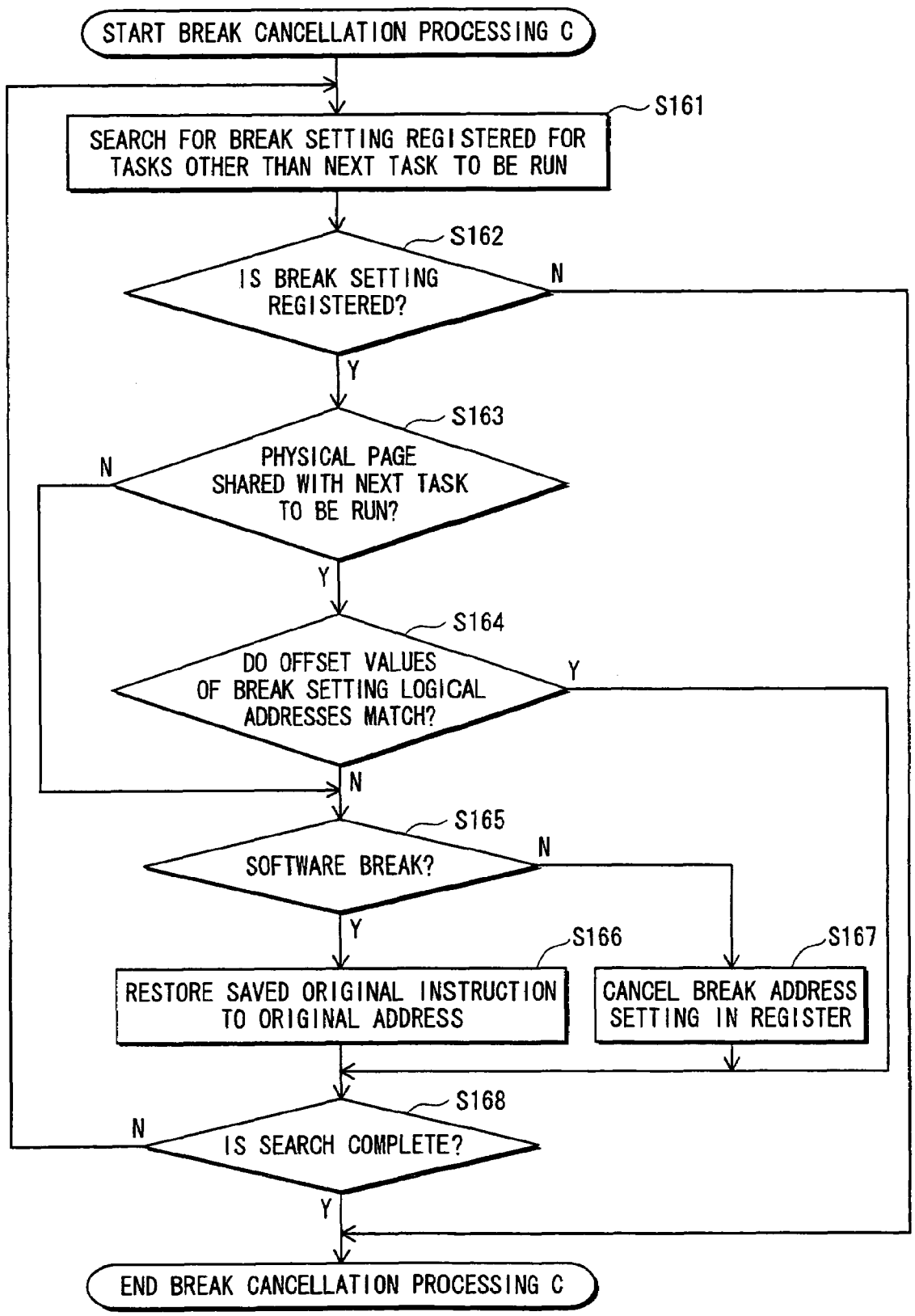
FIG. 16 is a flowchart showing operations for break cancellation processing C performed by a break cancellation unit 303.

FIG. 16 is a flowchart showing operations for break cancellation processing C performed by the break cancellation unit 303.

The break cancellation unit 303 obtains the identifier of the next task to be run from the multitask OS unit 301, and refers to the break setting table stored in the break setting table storage unit 108 to make a search as to whether or not a break setting is registered for a task identifier other than the task identifier of the next task to be run (step S161). If a break setting is registered for another task identifier (step S162:Y), the break cancellation unit 303 notifies, to the multitask OS unit 301, the respective logical addresses of the break setting of the other task identifier and the task identifier of the next task to be run, obtains the respective physical pages to which the logical addresses belong, from the multitask OS unit 301, and judges whether or not the two share a physical page (step S163).

Here, the multitask OS unit 301 refers to the page table stored in the page table storage unit 106 to specify the physical pages associated with the notified logical addresses, and notifies the physical pages to the break cancellation unit 303.

At step S163, if the logical addresses share a physical page (step S163:Y), the break cancellation unit 303 judges whether or not the respective offset values of the logical addresses match (step S164). If the offset values match (step S164:Y), the break cancellation unit 303 moves to the processing at step S168, and if the offset values do not match (step S164:N), the break cancellation unit 303 judges whether or not the break type is a software break (step S165).

If the break type is a software break (step S165:Y), the break cancellation unit 303 notifies the logical address at which the break setting is set to the multitask OS unit 301, causes the multitask OS unit 301 to specify the physical address in the RAM 12 of the logical address, obtains the specified physical address from the multitask OS unit 301, and writes the original instruction saved to the break setting table with respect to the break setting to the obtained physical address, thereby restoring the original instruction (step S166). The break cancellation unit 303 then judges whether or the break setting table has been searched for all break settings registered with respect to all identifiers other than the identifier of the next task to be run (step S168). If the search is complete (step S168:Y), the break cancellation unit 303 ends the break cancellation processing C. If the search is not complete (step S168:N), the break cancellation unit 303 moves to the processing at step S161.

If the judgment is negative at step S165 (step S165:N), the break cancellation unit 303 cancels the break address setting in the register of the CPU (step S167).

If the judgment is negative at step S162 (step S162:N), the break cancellation unit 303 ends the break cancellation processing C.

If the judgment is affirmative at step S164 (step S164:Y), the break cancellation unit 303 moves to the processing at step S168.

If the judgment is negative at step S163 (step S163:N), the break cancellation unit 303 moves to the processing at step S165.

Fourth Embodiment

In the debugging system 100 of the first embodiment, break cancellation processing is performed each time a task switch occurs. However, in the debugging system 400 in the fourth embodiment, break setting is performed in the same manner as in the first embodiment when a task switch occurs, and if the next task to be run and the stopped task do not share a physical page, break cancellation processing is omitted. This lightens the processing load for break cancellation processing.

Structure

The following omits a description of the compositional elements that are the same as in the debugging system 100 in the first embodiment, and focuses on those that differ.

Structure of Debugging Device 40

Figure 24:
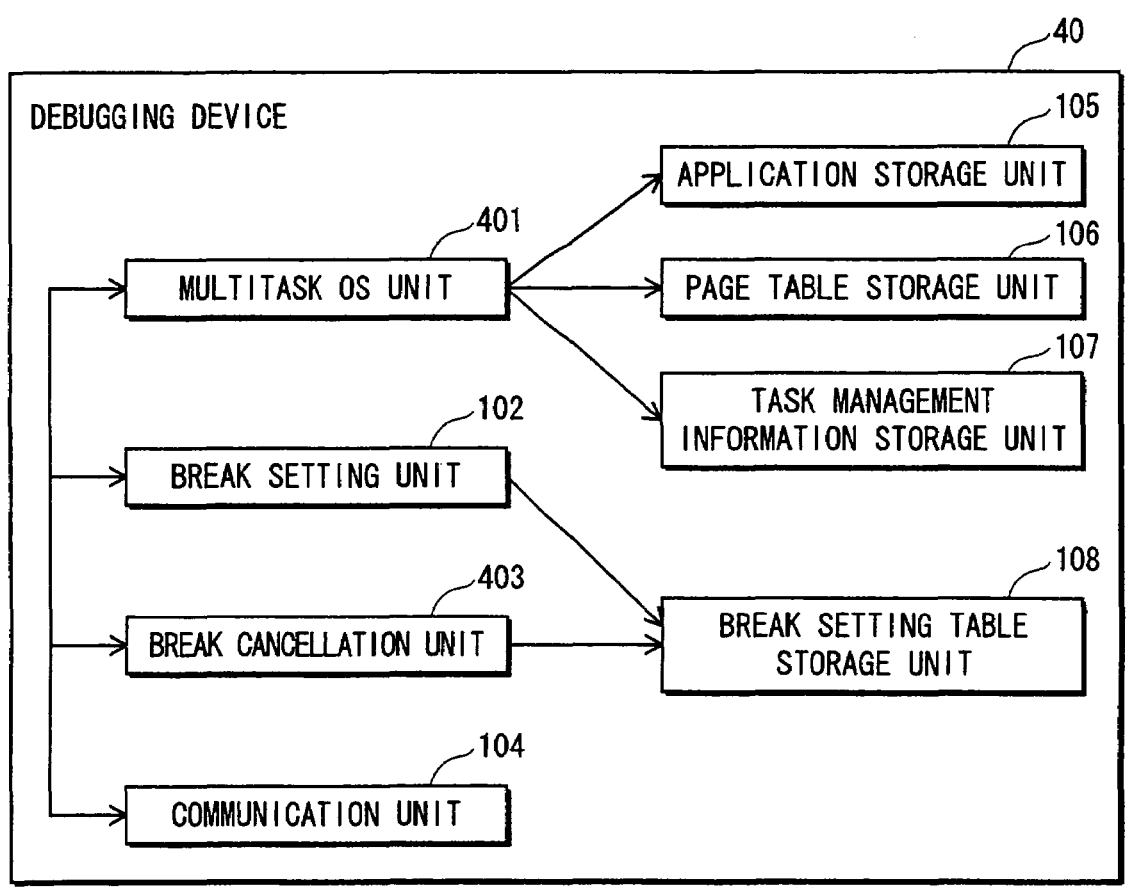
FIG. 24 is a function block diagram showing the structure of a debugging device 40 included in a debugging system 400.

FIG. 24 is a function block diagram showing the structure of a debugging device 40 included in the debugging system 400.

The debugging device 40 is composed of a multitask OS unit 401, the break setting unit 102, a break cancellation unit 403, the communication unit 104, the application storage unit 105, the page table storage unit 106, the task management information storage unit 107, and the break setting table storage unit 108.

In FIG. 24, the compositional elements that are the same as those in the debugging device 10 of the first embodiment have the same reference numbers there as.

The differences from the first embodiment in the functions of the multitask OS unit 401 and the break cancellation unit 403 are described later.

Operations

The following description focuses on differences from the first embodiment, and omits operations that are the same as the first embodiment.

Task Switch Processing D

Figure 17:
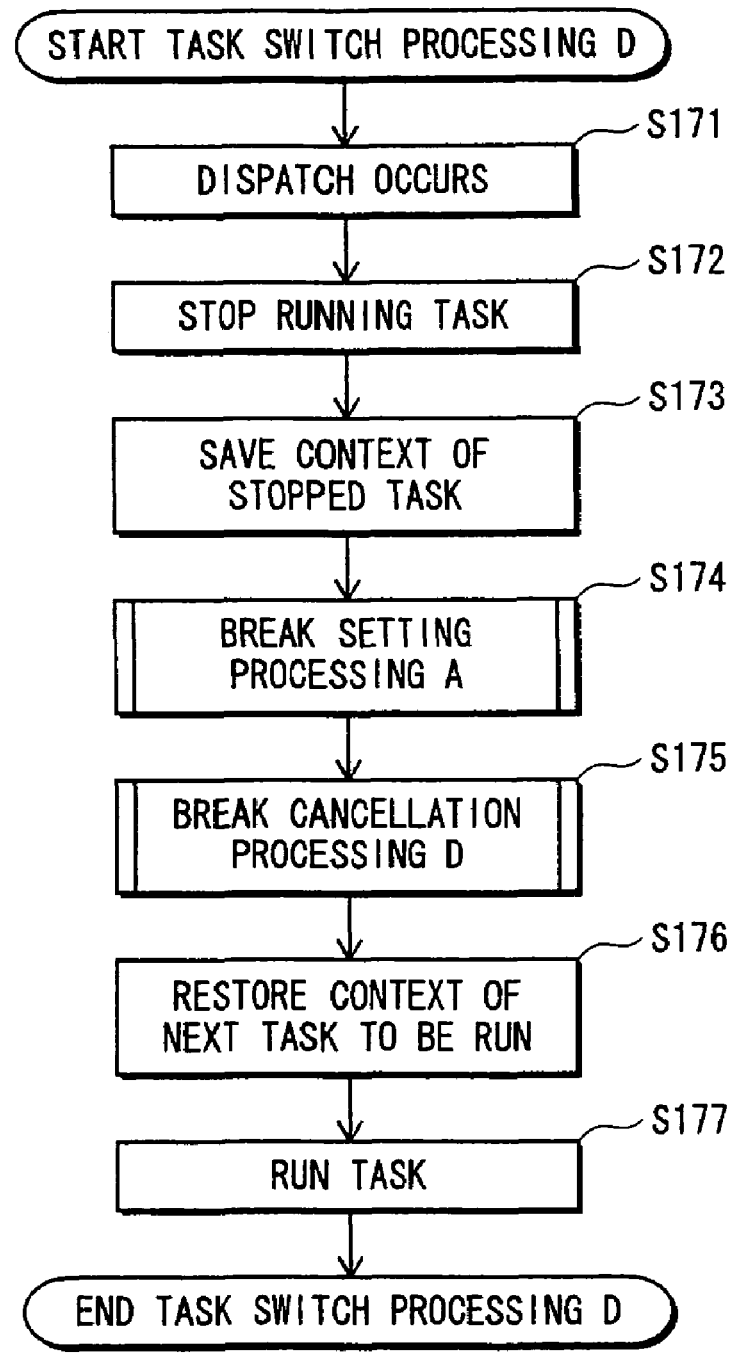
FIG. 17 is a flowchart showing operations for task switch processing D performed by a multitask OS unit 401.

FIG. 17 is a flowchart showing operations for task switch processing D performed by the multitask OS unit 401.

As shown in FIG. 17, the task switch processing D differs from the task switch processing A in the first embodiment in terms of the contents of break cancellation processing A shown at step S705.

Break Cancellation Processing D

Figure 18:
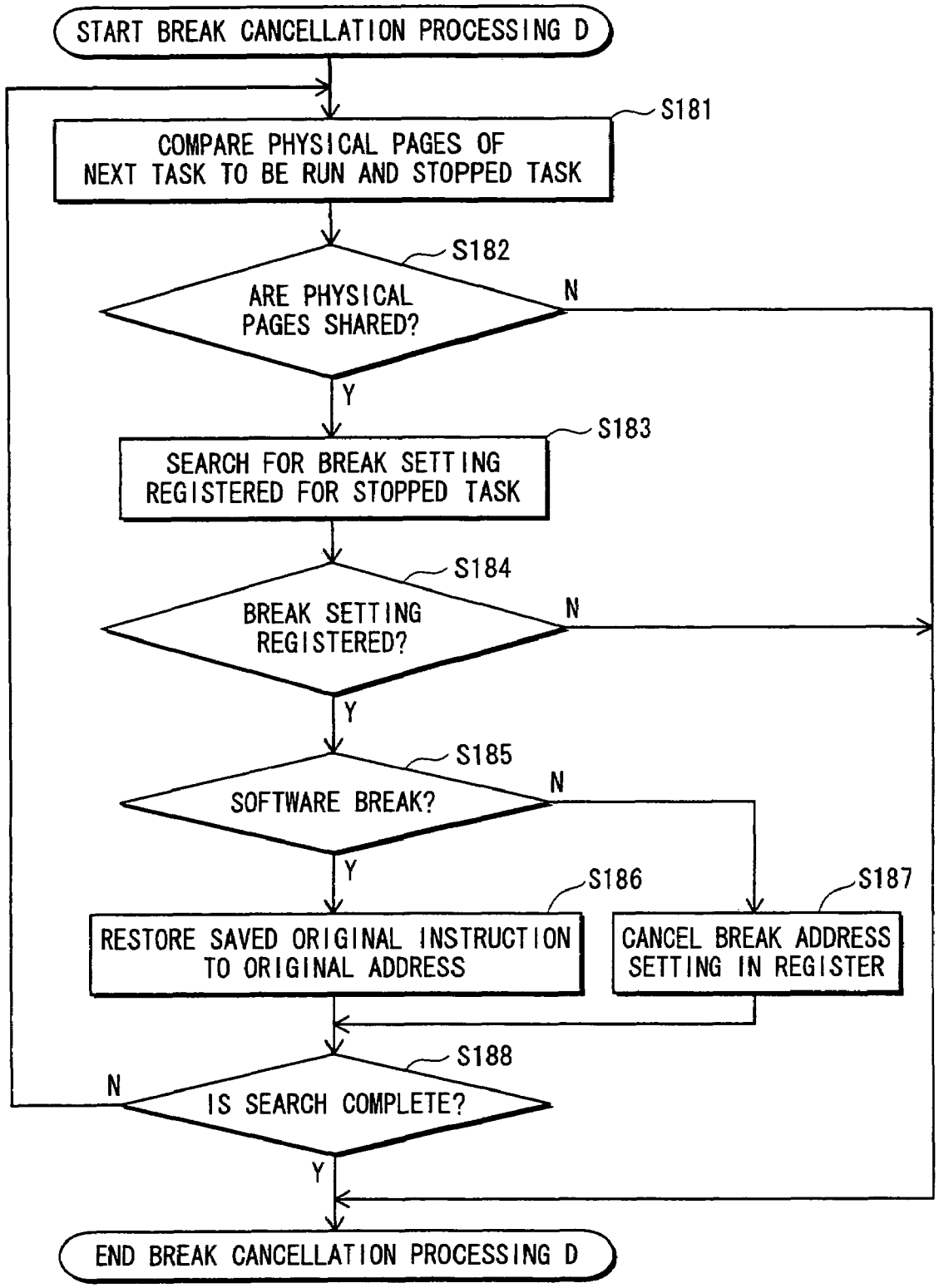
FIG. 18 is a flowchart showing operations for break cancellation processing D performed by a break cancellation unit 403.

FIG. 18 is a flowchart showing operations for break cancellation processing D performed by the break cancellation unit 403.

The break cancellation unit 403 obtains the respective task identifiers of the stopped task and the next task to be run from the multitask OS unit 401, then, via the multitask OS unit 401, specifies physical page allocated to the next task to be run and the physical page allocated to the stopped task, and compares the respective specified physical pages (step S181), to judge whether the two tasks share a physical page (step S182).

If the two tasks share a physical page (step S182:Y), the break cancellation unit 403 refers to the break setting table to make a search as to whether or not a break setting is registered for the task identifier of the stopped task (step S183). If a break setting is registered for the task identifier of the stopped task (step S184:Y), the break cancellation unit 403 judges whether or not the break setting for the stopped task identifier is a software break (step S185).

If the break setting is judged to be a software break (step S185:Y), the break cancellation unit 403 notifies the logical address at which the break setting is set to the multitask OS unit 401, causes the multitask OS unit 401 to specify the physical address in the RAM 12 of the notified logical address, obtains the specified physical address from the multitask OS unit 401, and writes the original instruction saved to the break setting table with respect to the break setting to the obtained physical address, thereby restoring the original instruction (step S186). The break cancellation unit 403 then judges whether or the break setting table has been searched for all break settings registered with respect to the identifier of the stopped task (step S188). If the search is complete (step S188:Y), the break cancellation unit 403 ends the break cancellation processing D. If the search is not complete (step S188:N), the break cancellation unit 403 moves to the processing at step S181.

If the judgment is negative at step S185 (step S185:N), the break cancellation unit 403 cancels the break address setting in the register of the CPU (step S187).

If the judgment is negative at step S182 (step S182:N), the break cancellation unit 403 ends the break cancellation processing D.

If the judgment is negative at step S184 (step S184:N.), the break cancellation unit 403 ends the break cancellation processing D.

Fifth Embodiment

In the debugging system 100 of the first embodiment, when a task switch occurs, break setting processing is first performed, and then when a break setting is made with respect to a stopped task, break cancellation processing is performed. However, in the debugging system 500 of the fifth embodiment, when a task switch occurs, first all break settings registered in the break setting table are cancelled, and then break setting processing is performed.

Structure

The following omits a description of the compositional elements that are the same as in the debugging system 100 in the first embodiment, and focuses on those that differ.

Structure of Debugging Device 50

Figure 25:
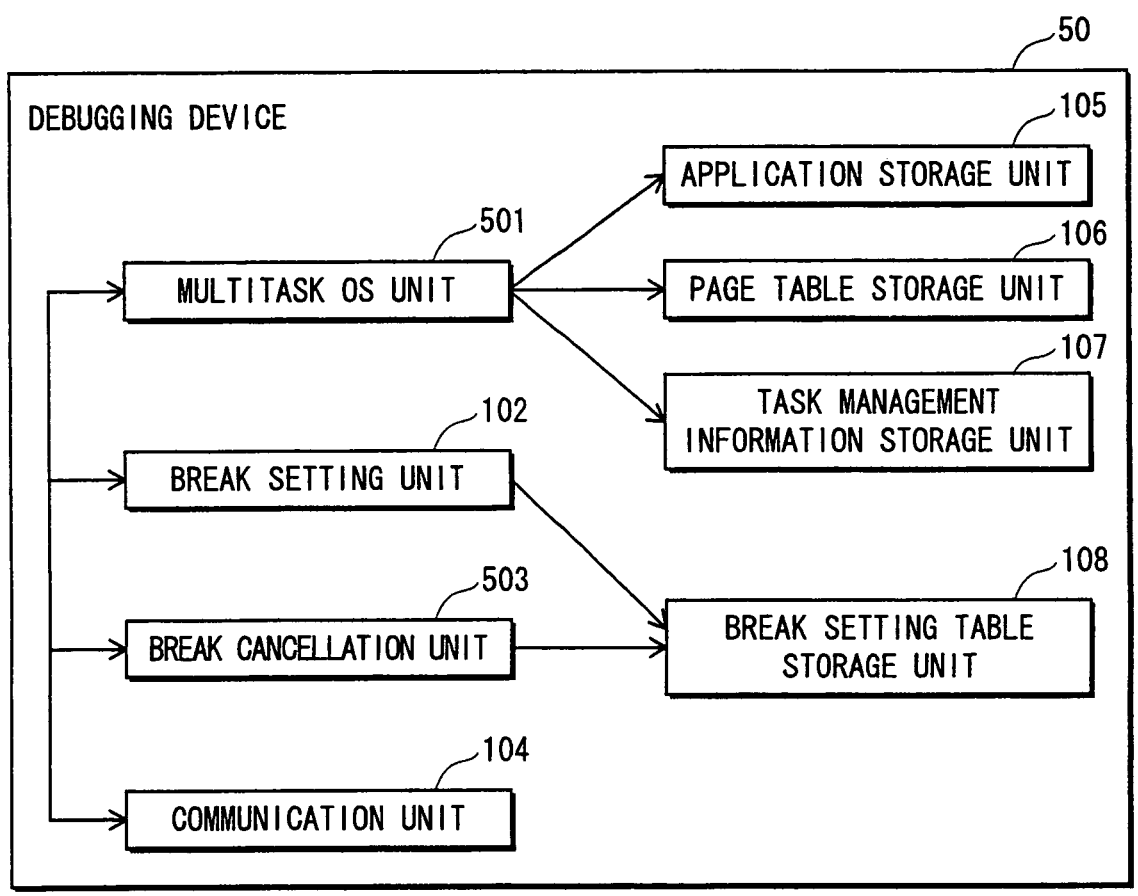
FIG. 25 is a function block diagram showing the structure of a debugging device 50 included in a debugging system 500.

FIG. 25 is a function block diagram showing the structure of the debugging device 50 included in the debugging system 500.

The debugging device 50 is composed of a multitask OS unit 501, the break setting unit 102, a break cancellation unit 503, the communication unit 104, the application storage unit 105, the page table storage unit 106, the task management information storage unit 107, and the break setting table storage unit 108.

In FIG. 25, the compositional elements that are the same as those in the debugging device 10 of the first embodiment have the same reference numbers there as.

The differences from the first embodiment in the functions of the multitask OS unit 501 and the break cancellation unit 503 are described later.

Operations

The following description focuses on differences from the first embodiment, and omits operations that are the same as the first embodiment.

Task Switch Processing E

Figure 19:
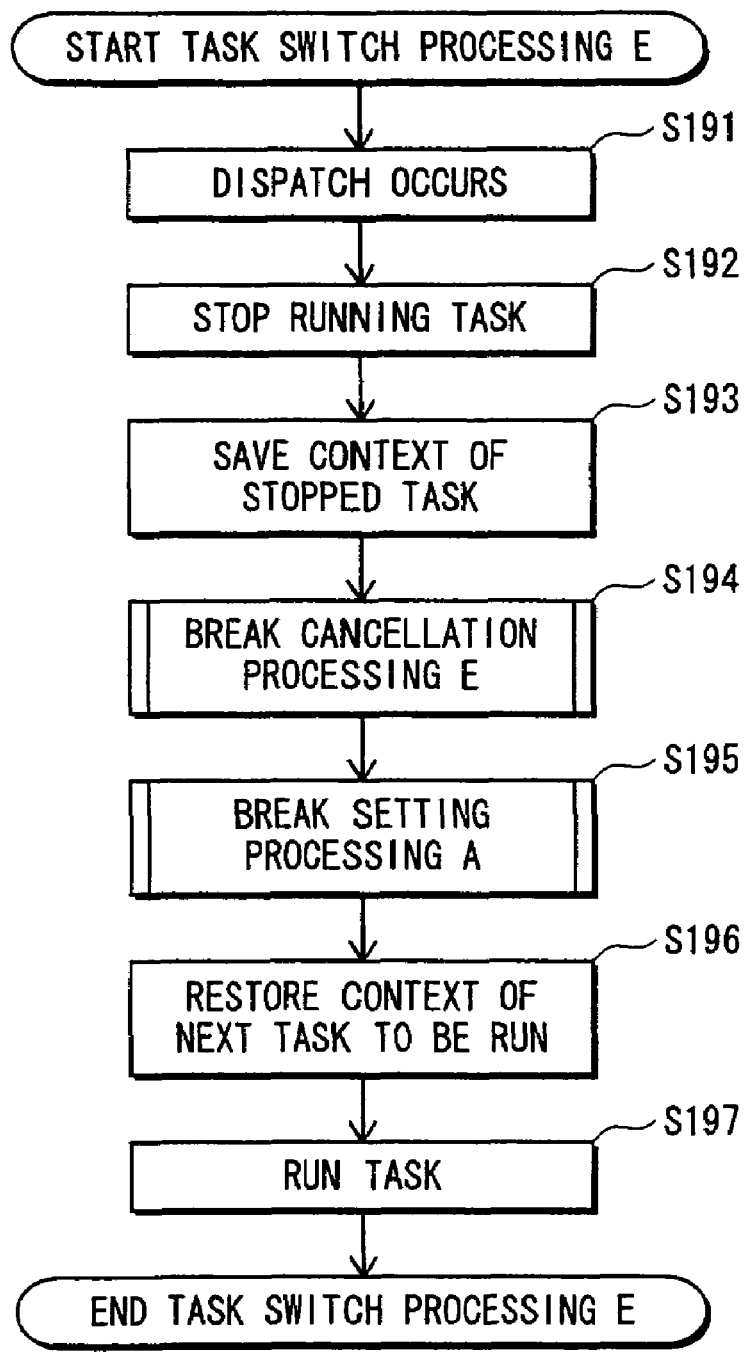
FIG. 19 is a flowchart showing operations for task switch processing E performed by a multitask OS unit 501.

FIG. 19 is a flowchart showing operations for task switch processing E performed by the multiplex OS unit 501.

As shown in FIG. 19, the task switch processing E differs from the task switch processing A in the first embodiment in that the order of the break setting processing and the break cancellation processing shown at step S704 and step S705 is reversed, and in terms of the content of the break cancellation processing shown at step S705.

Break Cancellation Processing E

Figure 20:
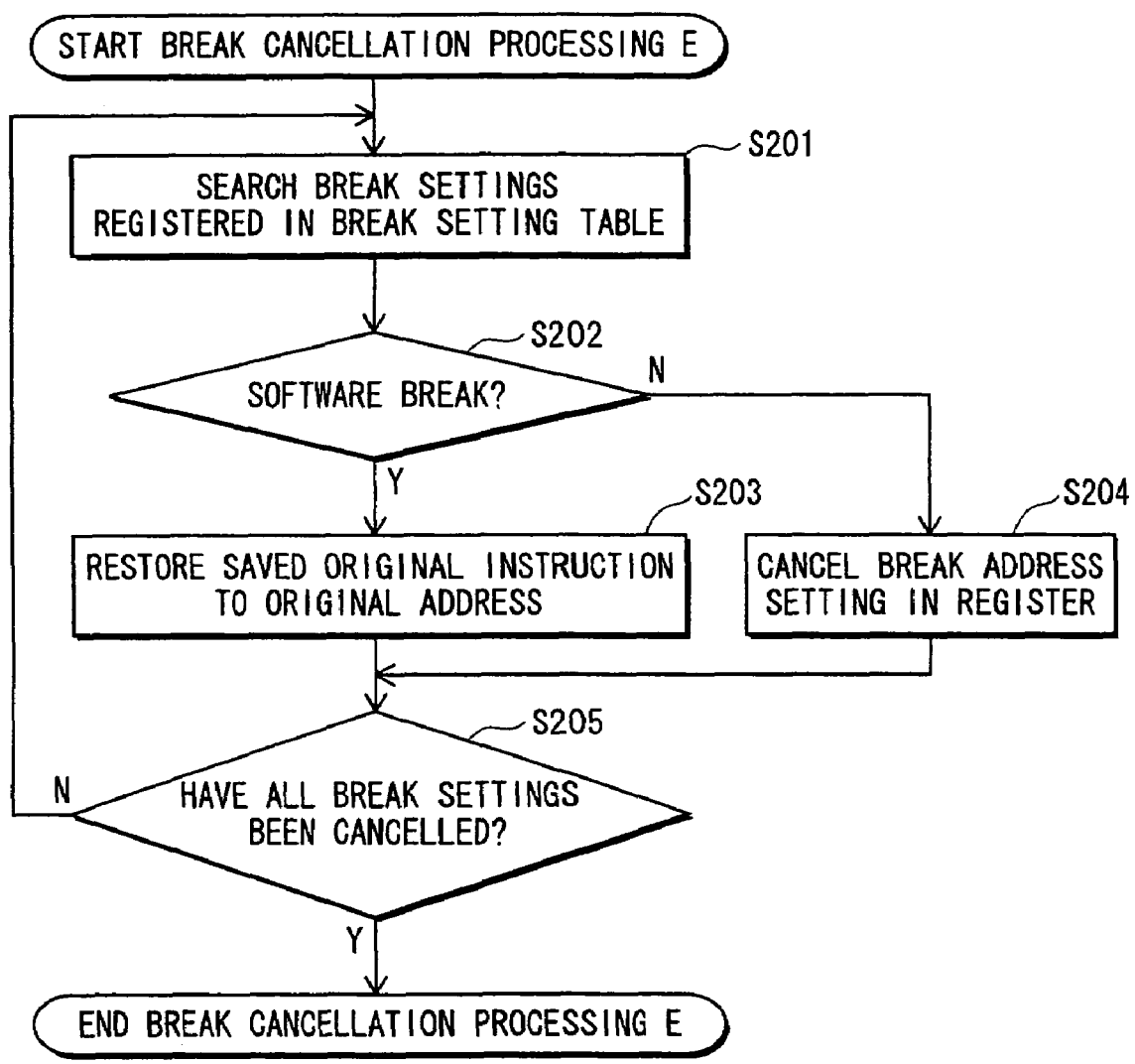
FIG. 20 is a flowchart showing operations for break cancellation processing E performed by a break cancellation unit 503.

FIG. 20 is a flowchart showing operations for break cancellation processing E performed by the break cancellation unit 503.

The break cancellation unit 503 makes a search of the break settings registered in the break setting table (step S201), and judges, for each break setting found as a result of the search, whether or not the break type is a software break, based on the break type shown by the break setting (step S202).

When the break setting is judged to be a software break at step S202 (step S202:Y), the break cancellation unit 503 notifies the logical address at which the break setting is set to the multitask OS unit 501, causes the multitask OS unit 501 to specify the physical address in the RAM 12 of the logical address, obtains the specified physical address from the multitask OS unit 501, and writes the original instruction saved to the break setting table with respect to the break setting to the obtained physical address, thereby restoring the original instruction (step S203), and canceling the break setting. The break cancellation unit 503 then judges whether or not all break settings registered in the break setting table have been cancelled (step S205), and if all have been cancelled (step S205:Y), ends the break cancellation processing E. If not all have been cancelled (step S205:N), the break cancellation unit 503 moves to the processing at step S201.

If the judgment at step S202 is negative (step S202:N), the break cancellation unit 503 cancels the break address setting in the register of the CPU (step S204).

Supplementary Remarks

The present invention is not limited to the described first to fifth embodiments.

(1) In the first to fifth embodiments, debugging processing is performed in a multitask environment by rewriting an original instruction into a break instruction. However, debugging processing may be performed by rewriting an original instruction not into a break instruction, but into another instruction. Alternatively, debugging processing may be performed by rewriting data at a specific physical address. Here, when a task switch occurs, debugging processing is performed instead of the break setting processing described in the first to fifth embodiments, and instead of the break cancellation processing, the debugging processing is cancelled by rewriting the rewritten instruction or data to an original instruction or data.

(2) In the first to fifth embodiments, break setting registration processing, break setting deletion processing and debugging are performed as a result of a command input from any of the terminals 1 to 3. However, alternatively an input unit may be provided in the debugging device, and aforementioned processing and debugging performed as a result of input from the input unit.

As a further alternative, instead of command input, break setting registration processing and break setting deletion processing may be performed by designating an identifier, logical address and break type pertaining to a break setting to be registered or cancelled, via a GUI (Graphic User Interface).

Figure 26:
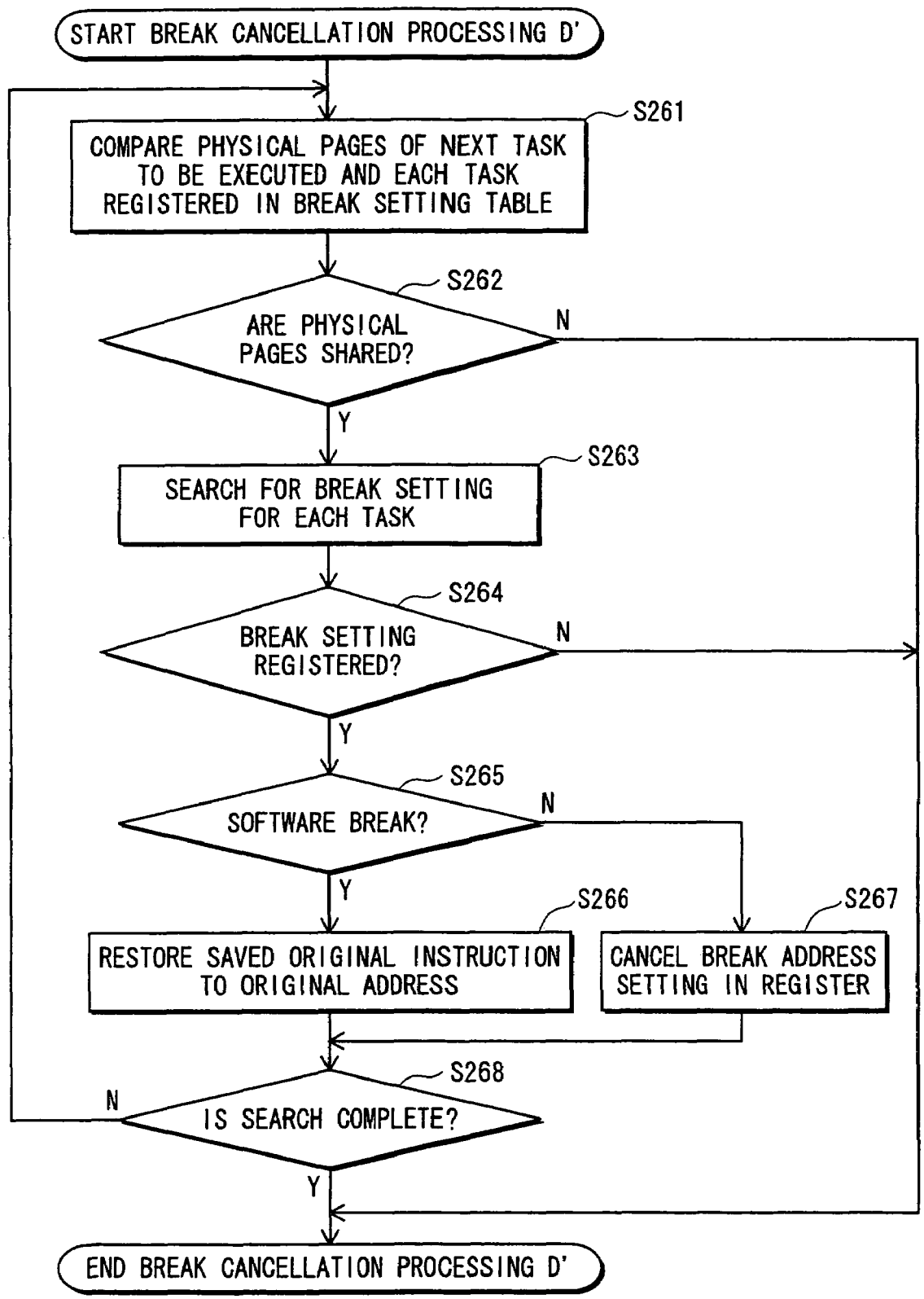
FIG. 26 is a flowchart showing operations for break cancellation processing D' performed by a break cancellation unit 403.

(3) In the fourth embodiment, break setting processing A is performed when a task switch occurs. However, break setting processing C may be performed instead of break setting processing A, and then break cancellation processing D' may be performed instead of break processing D for each task other than the next task to be run. FIG. 26 is a flowchart showing operations of break cancellation processing D' performed by the break cancellation unit 403 in the described case.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A debugging system that, in an execution environment in which a plurality of tasks are run successively by being switched therebetween according to a divided time schedule, executes debugging by performing debugging setting and debugging cancellation, the debugging setting being a process for rewriting part of original recording content in a memory area shared by at least two of the tasks, and the debugging cancellation being a process for restoring the original recording content, the debugging system comprising:

an address space storage unit operable to store, in association with each of the plurality of tasks, a physical address space range that the associated task uses in the memory area;

a setting information storage unit operable to store setting information that shows a correspondence between one of a plurality of target tasks and address information, each of the plurality of target tasks being a task among the plurality of tasks that is a target of debugging, and the address information specifying a physical address at which the debugging setting for the one of the plurality of target tasks is set; and a setting control unit operable to, when a task switch occurs, if a next task to be run is a target task, (a) put recording content at the physical address specified by the address information associated with the next task into a post-debugging setting state, and (b) put recording content at a physical address that is (i) specified by the address information associated with a target task other than the next task and (ii) within the physical address space range used by the next task, into a post-debugging cancellation state, and if the next task is not a target task, put recording content at a physical address that is (i) specified by the address information associated with a target task other than the next task and (ii) within the physical address space range used by the next task, into a post-debugging cancellation state, wherein the setting control unit includes:

a first setting unit operable to, when any of the plurality of tasks is to be run and if the task to be run is a target task, perform debugging setting only at the physical address specified by the address information associated with the task to be run;

a second setting unit operable to, each time a task switch period is subsequently arrived at and if a task to be run next is a target task, perform debugging setting only at the physical address specified by the address information associated with the task to be run next; and a cancellation unit operable to, if a pre-switch task is a target task, perform debugging cancellation with respect to the physical address of the debugging setting of the pre-switch task, the pre-switch task being a task running before the task switch;

a setting judgment unit operable to, each time a task switch period is reached, judge whether or not the pre-switch task and a post-switch task are both target tasks, the post-switch task being a task to be run after the pre-switch task; and an address judgment unit operable to, when the setting judgment unit judges that the pre-switch task and the post-switch task are both target tasks, judge whether or not the physical address specified by the address information of the pre-switch task and the physical address specified by the address information of the post-switch task match each other, and the second setting unit performs the debugging setting and the cancellation unit performs the debugging cancellation only if the physical addresses of the pre-switch task and the post-switch task are judged not to match each other.

2. The debugging system of claim 1, wherein the setting control unit further includes: a sharing judgment unit operable to, each time a task switch period is reached, judge whether or not the pre-switch task and a post-switch task share a physical address space range, the post-switch task being a task to be run after the task switch, and the cancellation unit performs debugging cancellation only if the pre-switch task and the post-switch task share a physical address space range.

3. A debugging method that, in an execution environment in which a plurality of tasks are run successively by being switched therebetween according to a divided time schedule, executes debugging by performing debugging setting and debugging cancellation, the debugging setting being a process for rewriting part of original recording content in a memory area shared by at least two of the tasks and the debugging cancellation being a process for restoring the original recording content, the debugging method including:

an address space storage unit operable to store, in association with each of the plurality of tasks, a physical address space range that the associated task uses in the memory area, and a setting information storage unit operable to store setting information that shows a correspondence between one of a plurality of target tasks and address information, each of the plurality of target tasks being a task among the plurality of tasks that is a target of debugging, and the address information specifying a physical address at which the debugging setting for the one of the plurality of target tasks is set, and the debugging method comprising:

a setting control step of, when a task switch occurs, if a next task to be run is a target task, (a) puffing recording content at the physical address specified by the address information associated with the next task into a post-debugging setting state and (b) puffing recording content at a physical address that is (i) specified by the address information associated with a target task other than the next task and (ii) within the physical address space range used by the next task, into a post-debugging cancellation state, and if the next task is not a target task, putting recording content at a physical address that is (i) specified by the address information associated with a target task others than the next task and (ii) within the physical address space range used by the next task, into a post-debugging cancellation state, wherein the setting control step includes:

a first setting step of, when any of the plurality of tasks is to be run and if the task to be run is a target task, performing debugging setting only at the physical address specified by the address information associated with the task to be run;

a second setting step of, each time a task switch period is subsequently arrived at and if a task to be run next is a target task, performing debugging setting only at the physical address specified by the address information associated with the task to be run next; and a cancellation step of, if a pre-switch task is a target task, performing debugging cancellation with respect to the physical address of the debugging setting of the pre-switch task, the pre-switch task being a task running before the task switch;

a setting judgment step of, each time a task switch period is reached, judging whether or not the pre-switch task and a post-switch task are both target tasks, the post-switch task being a task to be run after the pre-switch task; and an address judgment step of, when the setting judgment step judges that the pre-switch task and the post-switch task are both target tasks, judging whether or not the physical address specified by the address information of the pre-switch task and the physical address specified by the address information of the post-switch task match each other, and the second setting step performs the debugging setting and the cancellation step performs the debugging cancellation only if the physical addresses of the pre-switch task and the post-switch task are judged not to match each other.

4. The debugging method of claim 3, wherein the setting control step further includes:

a sharing judgment step of, each time a task switch period is reached, judging whether or not the pre-switch task and a post-switch task share a physical address space range, the post-switch task being a task to be run after the task switch, and the cancellation step performs debugging cancellation only if the pre-switch task and the post-switch task share a physical address space range.

* * * * *